United States Patent [19]

Barabash et al.

[11] Patent Number: 5,155,803
[45] Date of Patent: Oct. 13, 1992

[54] EXPERT SYSTEM FOR PERFORMING BETA-TOKEN PARTITIONING IN A RETE NETWORK

[75] Inventors: William Barabash, Acton; William S. Yerazunis, Hudson, both of Mass.

[73] Assignee: Digital Equipment Corporation, Maynard, Mass.

[21] Appl. No.: 364,021

[22] Filed: Jun. 8, 1989

[51] Int. Cl.[5] .............................................. G06F 15/00
[52] U.S. Cl. ......................................... 395/64; 395/11
[58] Field of Search ...................... 364/513; 395/64, 11

[56] References Cited

U.S. PATENT DOCUMENTS

| | | | |
|---|---|---|---|
| 4,752,890 | 6/1988 | Natarajan et al. | 364/513 |
| 4,761,746 | 8/1988 | Tano et al. | 364/513 |
| 4,837,735 | 6/1989 | Allen, Jr. et al. | 364/513 |

OTHER PUBLICATIONS

Wah et al., "A Survey on the Design of Multiprocessing Systems for Artifical Intelligence Applications", IEEE Trans. on Systems, Man, and Cybernetics, vol. 19, No. 4, pp. 667–692, Apr. 18, 1989.
Muldovan, "Rubic: A Multipresser for Rue-Based Systems", IEEE Trans. on Systms, Man, and Cybernetics, vol. 19, No. 4, Jul. 8, 1989, pp. 699–706.
Parson et al., "Constant-Time Pattern Machine for Real-Time Production Systems", SPIE v 1095, Appl. of Artificial Intelligence VII (1989), pp. 971–982.
C. L. Forgy, "Rete: A Fast Algorithm for the Many Pattern/Many Object Pattern Match Problem", Artificial Intelligence, 1982, pp. 17–37.
W. D. Hillis et al., "Data Parallel Algorithms", Communications of the Acm, vol. 29, No. 12, pp. 1170–1183.
U.S. application Ser. No. 103,364, by W. S. Barabash et al. entitled "Method for Operating a Parallel Processing System and Related Apparatus".

Primary Examiner—Allen R. MacDonald
Attorney, Agent, or Firm—Kenyon & Kenyon

[57] ABSTRACT

A new expert system that facilitates beta-token partitioning of rules in a RETE network. The expert system includes a beta opinion value generating portion that generates, for each node in the RETE network, an opinion value in response to processing statistics. A beta decision value generating portion generates a beta-token partition opinion value for a rule in response to the beta opinion values for nodes in the RETE network defining a rule.

125 Claims, 18 Drawing Sheets

RULE DATA STRUCTURE 150: RULE ID (151), PARTITION TYPE (152), L/R SIDE (153), LEVEL (154), GROUP (155), OPINION (156), FLAGS (157)

NODE ACTIVATION DATA STRUCTURE 120: RULE ID (121), NODE TYPE (122), L/R SIDE (123), NODE ID (124), NODE NUM (125), TOT ACTIV (126), TOT EMIT (127), TOT COMPS (130), MAX ACTIV (131), MAX EMIT (132), MAX COMPS (133), MAX TIME (134), TOT TIME (135), OPINION (136), DECISION (137), FLAGS (140)

FIG. 3C-1

```
                    BETA PARTITIONING OPINION RULES         ①

RULE H1:    IF
                    CONTEXT   BETA_HEURISTICS = ACTIVE
            <THE_NODE> NODE   RULE ID = <PR>
                              NODE TYPE = NOT
                              FLAG T1 = EMPTY
            THEN
                    MODIFY    <THE_NODE>
                              OPINION = -1000
                              FLAG T1 = SET

RULE H2:    IF
                    CONTEXT   BETA_HEURISTICS = ACTIVE
            <THE_NODE> NODE   RULE ID = <PR>
                              NODE NUM = 1
                              L/R SIDE = L
                              FLAG T9 = CLEAR
            THEN
                    MODIFY    <THE_NODE>
                              OPINION = OPINION-1
                              FLAG T9 = SET
```

FIG. 3C-2

```
                    BETA PARTITIONING OPINION RULES          ②
    RULE H3:    IF
                        CONTEXT BETA_HEURISTICS = ACTIVE
         <THE_NODE>   NODE    RULE ID = <PR>
                              NODE NUM = <NN>
                              L/R SIDE = <LR>
                              NODE TYPE = AND
                              FLAG T2 = CLEAR
                      NODE    RULE ID = <PR>
                              NODE NUM = <NN>
                              L/R SIDE ≠ <LR>
                              MAX COMPS > PARAM <GOOD_MAX_COMPS>
                THEN
                        MODIFY <THE_NODE>
                              OPINION = OPINION +7
                              FLAG T2 = SET

RULE H4:    IF
                        CONTEXT BETA_ HEURISTICS = ACTIVE
         <THE_NODE>   NODE    RULE ID = <PR>
                              NODE NUM = <NN>
                              L/R SIDE = R
                              NODE TYPE = AND
                              MAX COMPS > PARAM <GOOD_MAX_COMPS>
                              FLAG T8 = CLEAR
         <A_PARENT>   NODE    RULE ID = <PR>
                              NODE NUM = <NN> -1
                              L/R SIDE = <LR>
                              MAX COMPS = <M_COMP>
         <OTHER_PARENT> NODE  RULE ID = <PR>
                              NODE NUM = <NN> -1
                              L/R SIDE ≠ <LR>
                              MAX COMPS ≥ M_COMP
                THEN
                        MODIFY <THE_NODE>
                              FLAG T8 = SET
                                  <OTHER_PARENT>
                              OPINION = OPINION + 5
```

BETA PARTITIONING OPINION RULES ③

RULE H5: IF
    CONTEXT BETA_HEURISTICS = ACTIVE
    <THE_NODE> NODE  RULE ID = <PR>
                          MAX COMPS < PARAM <BAD_MAX_COMPS>
                          FLAG T3 = CLEAR
    THEN
        MODIFY <THE NODE>
            OPINION = OPINION -4
            FLAG T3 = SET

RULE H6: IF
    CONTEXT BETA_HEURISTICS = ACTIVE
    <THE_NODE> NODE  RULE ID = <PR>
                          NODE TYPE = AND
                          MAX EMIT > PARAM <GOOD_MAX_EMIT>
                          FLAG T4 = CLEAR
    THEN
        MODIFY <THE NODE>
            OPINION = OPINION +5
            FLAG T4 = SET

RULE H7: IF
    CONTEXT BETA_HEURISTICS = ACTIVE
    <THE_NODE> NODE  RULE ID = <PR>
                          NODE NUM = <NN>
                          L/R SIDE = L
                          MAX ACTIV > PARAM <GOOD_MAX_ACTIV>
                          OPINION = <OP>
                          FLAG T5 = CLEAR
    <L_PARENT> NODE  RULE ID = <PR>
                          NODE NUM = <NN> -1
                          L/R SIDE = L
                          OPINION = <OPL>
    <R_PARENT> NODE  RULE ID = <PR>
                          NODE NUM = <NN> -1
                          OPINION = <OPR>
                          L/R SIDE = R
    THEN
        MODIFY <THE_NODE>
            OPINION = <OP> +3
            FLAG T5 = SET
                <L_PARENT>
            OPINION = <OPL> +2
                <R_PARENT>
            OPINION = <OPR> +2

```
                BETA PARTITIONING OPINION RULES         ④
RULE H8:   IF
                   CONTEXT BETA_HEURISTICS = ACTIVE
     <THE_NODE>    NODE    RULE ID = <PR>
                           L/R SIDE = R
                           NODE TYPE = AND
                           MAX ACTIV > PARAM<GOOD_MAX_ACTIV>
                           FLAG T10 = CLEAR
           THEN
                   MODIFY <THE_NODE>
                           OPINION = OPINION +4
                           FLAG T10 = SET

RULE H9:   IF
                   CONTEXT BETA_HEURISTICS = ACTIVE
     <THE_NODE>    NODE    RULE ID = <PR>
                           NODE TYPE = AND
                           TOT EMIT > PARAM <GOOD_TOT_EMIT>
                           FLAG T6 = CLEAR
           THEN
                   MODIFY <THE_NODE>
                           OPINION = OPINION +2
                           FLAG T6 = SET

RULE H10:  IF
                   CONTEXT BETA_HEURISTICS = ACTIVE
     <THE_NODE>    NODE    RULE ID = <PR>
                           NODE NUM = <NN>
                           L/R SIDE = <LR>
                           NODE TYPE = AND
                           FLAG T7 = CLEAR
     <SIBLING_NODE> NODE   RULE ID = <PR>
                           NODE NUM = <NN>
                           L/R SIDE ≠ <LR>
                           TOT COMPS > PARAM <GOOD_TOT_COMPS>
           THEN
                   MODIFY <THE_NODE>
                           OPINION = OPINION +4
                           FLAG T7 = SET
```

FIG. 3C-5

BETA PARTITIONING OPINION RULES ⑤

```
RULE H11:    IF
                    CONTEXT BETA_HEURISTICS = ACTIVE
        <THE_NODE> NODE    RULE ID = <PR>
                           NODE TYPE = AND
                           MAX TIME > PARAM <GOOD_MAX_TIME>
                           FLAG T11 = CLEAR
             THEN
                    MODIFY <THE_NODE>
                           OPINION = OPINION +4
                           FLAG T11 = SET

RULE H12:    IF
                    CONTEXT BETA_HEURISTICS = ACTIVE
        <THE_NODE> NODE    RULE ID = <PR>
                           NODE TYPE = AND
                           TOT TIME > PARAM <GOOD_TOT_TIME>
                           FLAG T12 = CLEAR
             THEN
                    MODIFY <THE_NODE>
                           OPINION = OPINION +3
                           FLAG T12 = SET

RULE H13:    IF
                    CONTEXT BETA_HEURISTICS = ACTIVE
        <THE_NODE> NODE    RULE ID = <PR>
                           NODE TYPE = AND
                           TOT ACTIV >> TOT EMIT
             THEN
                    MODIFY <THE_NODE>
                           OPINION = OPINION -1
                           FLAG T13 = SET
```

FIG. 3D-1

BETA DECISIONS ①

```
RULE D1:    IF
                CONTEXT MAKE_BETA_DECISIONS = ACTIVE
    <THE_NODE> NODE    RULE ID = <PR>
                       NODE NUM = 1
                       L/R SIDE = <LR>
                <OP>   OPINION ≥ PARAM <GOOD_BETA_CONST>
                       DECISION = <EMPTY>
               NODE    RULE ID = <PR>
                       NODE NUM = 1
                       L/R SIDE ≠ <LR>
                       OPINION ≤ <OP>
               NODE    RULE ID = <PR>
                       NODE NUM = 2
                       L/R SIDE = <LR2>
                       OPINION < <OP> + PARAM<GOOD_BETA_DELTA>
               NODE    RULE ID = <PR>
                       NODE NUM = 2
                       L/R SIDE ≠ <LR2>
                       OPINION < <OP> + PARAM <GOOD_BETA_DELTA>
            THEN
                MODIFY <THE_NODE>
                       DECISION = BETA_PART_HERE
                MAKE   RULE
                       RULE ID = <PR>
                       PARTITION TYPE = BETA
                       LEVEL = 1
                       L/R SIDE = <LR>
                       OPINION = <OP>
```

FIG. 3D-2

```
                    BETA DECISIONS        ②
RULE D2:   IF
                CONTEXT MAKE_BETA_DECISIONS = ACTIVE
    <THE_NODE>  NODE    RULE ID = <PR>
                        NODE NUM = 1
                        L/R SIDE = <LR>
                    <OP> OPINION ≥ PARAM <GOOD_BETA_CONST>
                        DECISION = EMPTY
                NODE    RULE ID = <PR>
                        NODE NUM = 1
                        L/R SIDE ≠ <LR>
                        OPINION < <OP>
                NOT NODE RULE ID = <PR>
                        NODE NUM = 2
                NODE    RULE ID = <EOF>
                        NODE NUM = <EOF>
           THEN
                MODIFY <THE_NODE>
                        DECISION = BETA_PART_HERE
                MAKE    RULE
                        RULE ID = <PR>
                        PARTITION TYPE = BETA
                        LEVEL = 1
                        L/R SIDE = <LR>
                        OPINION = <OP>

RULE D3:   IF
                CONTEXT MAKE_BETA_DECISIONS = ACTIVE
    <THE_NODE>  NODE    RULE ID = <PR>
                        OPINION < PARAM <GOOD_BETA_CONST>
                        DECISION = EMPTY
           THEN
                MODIFY <THE_NODE>
                        DECISION = NO
```

FIG. 3D-3

```
                       BETA DECISIONS      ③
RULE D4:   IF
                       CONTEXT MAKE_BETA_DECISIONS = ACTIVE
        <THE_NODE>     NODE    RULE ID = <PR>
                               NODE NUM = <NN>
                           <OP> OPINION ≥ PARAM <GOOD_BETA_CONST>
                               DECISION = EMPTY
                       NODE    RULE ID = <PR>
                               NODE NUM = <NN> +1
                               OPINION ≥ <OP> + PARAM <GOOD_BETA_DELTA>
           THEN
                       MODIFY <THE_NODE>
                               DECISION = NO

RULE D5:   IF
                       CONTEXT MAKE_BETA_DECISIONS = ACTIVE
        <THE_NODE>     NODE    RULE ID = <PR>
                               NODE NUM = <NN>
                               L/R SIDE = <LR>
                           <OP> OPINION ≥ PARAM <GOOD_BETA_CONST>
                               DECISION = EMPTY
        <SIBLING_NODE> NODE    RULE ID = <PR>
                               NODE NUM = <NN>
                               L/R SIDE ≠ <LR>
                           <OP2> OPINION ≤ <OP>
                       NODE    RULE ID = <PR>
                               NODE NUM = <NN> -1
                               DECISION = NO
                               L/R SIDE = L
                       NODE    RULE ID = <PR>
                               NODE NUM = <NN> -1
                               DECISION = NO
                               L/R SIDE = R
                   NOT NODE    RULE ID = <PR>
                               NODE NUM = <NN> +1
                       NODE    RULE ID = EOF
                               NODE NUM = EOF
           THEN
                       MODIFY <THE_NODE>
                               DECISION = BETA
                       MAKE    RULE
                               RULE ID = <PR>
                               PARTITION TYPE = BETA_PART_HERE
                               LEVEL = <NN>
                               L/R SIDE = <LR>
                               OPINION = <OP>
                       MAKE    CONTEXT FLUSH_ALL_NODES = ACTIVE
```

FIG. 3D-4

```
                    BETA DECISIONS        ④

RULE D6:    IF
                    CONTEXT  MAKE_BETA_DECISIONS = ACTIVE
      <THE_NODE>  NODE    RULE ID = <PR>
                          NODE NUM = <NN>
                          L/R SIDE = <LR>
                    <OP>  OPINION ≥ PARAM <GOOD_BETA_CONST>
                          DECISION = EMPTY
                  NODE    RULE ID = <PR>
                          NODE NUM = <NN>
                          L/R SIDE ≠ <LR>
                          OPINION ≤ <OP>
                  NODE    RULE ID = <PR>
                          NODE NUM = <NN> -1
                          L/R SIDE = L
                          DECISION = NO
                  NODE    RULE ID = <PR>
                          NODE NUM = <NN> -1
                          L/R SIDE = R
                          DECISION = NO
                  NODE    RULE ID = <PR>
                          NODE NUM = <NN> +1
                          L/R SIDE = L
                          OPINION < <OP> + PARAM <GOOD_BETA_DELTA>
                  NODE    RULE ID = <PR>
                          NODE NUM = <NN> +1
                          L/R SIDE = R
                          OPINION < <OP> + PARAM <GOOD_BETA_DELTA>
            THEN
                  MODIFY <THE_NODE>
                          DECISION = BETA
                  MAKE    RULE
                          RULE ID = <PR>
                          PARTITION TYPE = BETA_PART_HERE
                          LEVEL = <NN>
                          L/R SIDE = <LR>
                          OPINION = <OP>
                  MAKE    CONTEXT FLUSH_ALL_NODES = ACTIVE
```

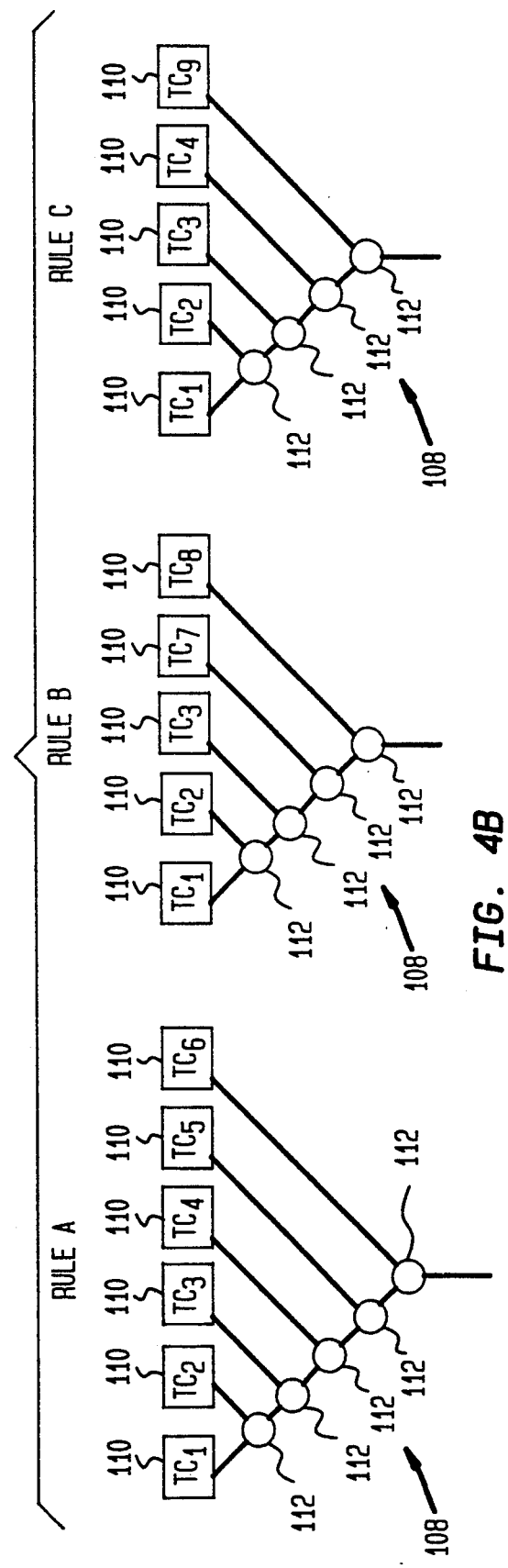
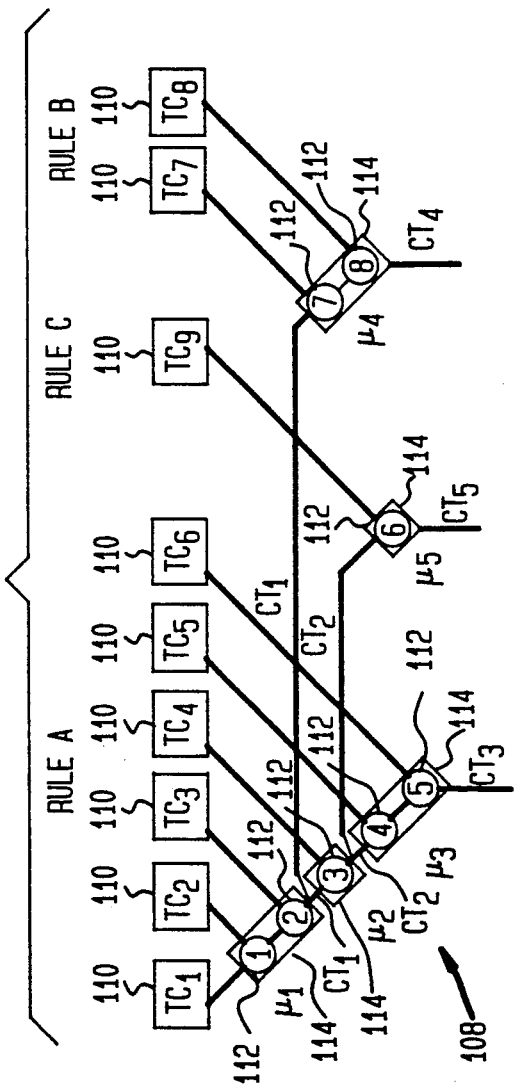
FIG. 4A
FIG. 4B

FIG. 6

| CYCLE i | $\mu_1$ | $\mu_2$ | $\mu_3$ | $\mu_4$ | $\mu_5$ | ... | $\mu_m$ |
|---|---|---|---|---|---|---|---|
| 1 | $t_{11}$ | $t_{12}$ | $t_{13}$ | $t_{14}$ | $t_{15}$ | ... | $t_{1m}$ |
| 2 | $t_{21}$ | $t_{22}$ | $t_{23}$ | $t_{24}$ | $t_{25}$ | ... | $t_{2m}$ |
| 3 | $t_{31}$ | $t_{32}$ | $t_{33}$ | $t_{34}$ | $t_{35}$ | ... | $t_{3m}$ |
| ⋮ | ⋮ | ⋮ | ⋮ | ⋮ | ⋮ | | ⋮ |
| P | $t_{P1}$ | $t_{P2}$ | $t_{P3}$ | $t_{P4}$ | $t_{P5}$ | ... | $t_{Pm}$ |
| TOTAL | $S_1$ | $S_2$ | $S_3$ | $S_4$ | $S_5$ | ... | $S_m$ |

$$e_i = ((\mu_1, t_{i1})(\mu_2, t_{i2}) \ldots (\mu_m, t_{i,m}))$$

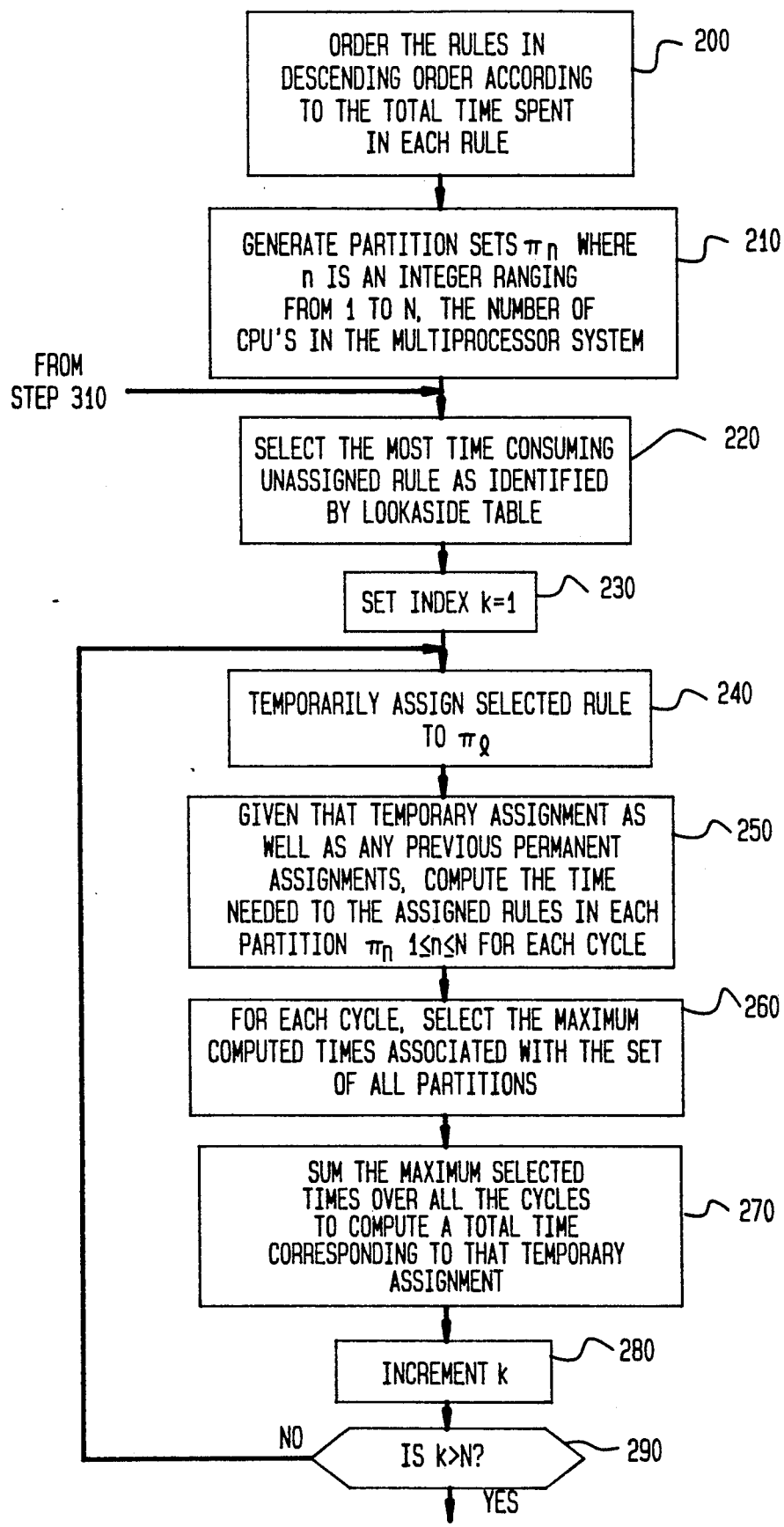

EXPERT SYSTEM FOR PERFORMING BETA-TOKEN PARTITIONING IN A RETE NETWORK

INCORPORATION BY REFERENCE

U.S. patent application Ser. No. 103,364, filed Sept. b 30, 1987, in the names of William Barabash and William S. Yerazunis, for Method For Operating A Parallel Processing System And Related Apparatus now U.S. Pat. No. 4,965,882 expressly, incorporated herein by reference.

1. FIELD OF THE INVENTION

The invention relates generally to the field of artificial intelligence systems, and more particularly to rule-based systems in which various conditions defined by the rules are processed in the form of reticular networks to facilitate efficient identification of the rules in condition for firing.

BACKGROUND OF THE INVENTION

Rule-based artificial intelligence systems, generally known as expert systems, typically include a set of rules, forming a "knowledge base", one or more facts in a working memory, and an inference engine that manipulates the rules in response to the facts in the working memory. By a process known as "inference", the inference engine attempts to match conditions in each of the rules to the facts in the working memory. If the conditions of a particular rule match the facts, the rule is said to "fire", and the inference engine then performs actions or operations specified in the rule. These operations may include, for example, addition, deletion and/or modification of facts in the working memory, transmission of results to a user, and so forth. The condition matching/firing sequence is sometimes referred to as a "recognize/act" cycle, with "recognize" referring to the portion of the operation in which the interference engine compares conditions of the rules to the facts in working memory to determine which, if any, rules fire, and "act" referring to the portion of the operation in which the inference engine actually performs the actions and operations specified in the rule. If, during firing of a rule, the inference engine adds, deletes or modifies a fact, the inference engine may repeat these operations in response to the new or modified facts in the working memory, which may, in turn, cause other rules to fire. Rule processing begins when an addition, modification or deletion is made to the facts in the working memory, and proceeds iteratively until no further additions, modifications or deletions are made to the facts in the working memory.

More particularly, each rule includes one or more conditions, which are collectively referred to as the "left-hand side", and a "right-hand side" which contains an action list, which identifies one or more operations performed if the rule fires. The facts in the working memory are typically organized as one or more relations, with each relation comprising one or more entries, or items of data. Each entry in a relation, in turn, is identified as having one or more slots. Each relation is identified by a class name, and each slot is identified by a slot name. A condition identifies a relation by class name, one or more slots, by name, and, optionally, a set of limits or requirements on the values for each named slot. In the comparison operation, the inference engine determines whether the relation in the working memory that corresponds to the class name in the condition contains an entry whose slot values correspond to the slot values set forth in the condition. If so, the condition is satisfied. However, if the working memory does not have an entry whose slots contain the values specified in the condition, the condition is not satisfied. To determine whether a rule is in condition to fire, the inference engine performs the existence test in connection with each condition in the rule.

The existence test can be somewhat more complicated, particularly in connection with a rule in which one or more of a condition's slot values are expressed as variable values. If a condition identifies a class and one or more slot values, at least one of which is specified by a variable and the values identified for each of the other slot names match the values in their corresponding slots in the working memory entry, the condition is satisfied by each entry in the relation identified by the class name in which the variable is satisfied. In the match operation for a condition with a variable, the inference engine establishes one or more binding lists for the variables that identify the set of values in the slots in the various entries in the relation which can satisfy the condition. The values of the variables in each binding list are propagated through subsequent conditions comprising the rule's left hand side to determine whether each successive condition is satisfied, with each set of values comprising the binding lists that satisfy the rule resulting in a different instantiation of the rule. The inference engine may then perform a conflict resolution operation among the rules and instantiations to select a rule, and specifically an instantiation if the rule has multiple instantiations, for firing.

One way in which the inference engine may determine if the rules' conditions are satisfied is to test each of the conditions of each of the rules against the facts in the working memory and keep track of the rules whose conditions are satisfied. However, in many circumstances the same condition is included in a number of rules. Further, in most circumstances, it is not necessary to evaluate every working memory relation against each rule during each recognize/act cycle. Instead, partial lists of relation/rule associations can be maintained and incremental updates performed to these lists as relations are added, deleted or modified. To avoid the necessity of testing or retesting such conditions for each rule, reticular, or "RETE" networks have been developed. In a reticular network, the conditions of all the rules are organized as a series of test nodes, with one test node being associated with each condition. Each of the rules, in turn, is represented by a terminal node. The test nodes are connected to the terminal nodes through a network of join nodes, each of which represents a logical operation in connection with each successive condition in the rule. During the "recognize" portion of the recognize/act cycle, tokens are passed between the nodes representing successful comparisons, with the tokens that eventually reach the terminal node representing the various instantiations of the rule. These tokens which represent successful comparisons are termed "beta tokens."

In beta-token partitioning systems, these beta tokens are divided among multiple processors of a computer system in order to approximately equally divide the computational load among the processors.

SUMMARY OF THE INVENTION

The invention provides a new and improved system for facilitating beta-token partitioning in connection with rules in a target expert system program.

In brief summary, in one aspect the invention provides a new expert system that facilitates beta-token partitioning of rules in a RETE network. The expert system includes a beta opinion value generating portion that generates, for each node in the RETE network, an opinion value in response to processing statistics. A beta decision value generating portion generates a beta partition decision value for a rule in response to the beta opinion value for nodes in the RETE network defining a rule.

In another aspect, the invention provides a method of beta-token partitioning a target expert system program. In the new method, the target expert system program is compiled to form a RETE network for execution on a single processor. The target expert system program is then executed on a single processor to obtain processing statistics in connection with each node of the RETE network. Thereafter, a beta-token partitioning expert system identifies nodes in the RETE network for beta-token partitioning, and the target expert system program is recompiled to form a RETE network for execution on multiple processors, the RETE network being beta-token partitioned at nodes identified by the beta-token partitioning expert system. In the method, the beta-token partitioning expert system step includes the steps of generating, for each node in the RETE network, an beta opinion value in response to processing statistics, and generating a beta-token partition decision value for the rule in response to the beta opinion values.

In yet a further aspect, the invention provides a system comprising a uniprocessor compiler for compiling a target expert system program to form a RETE network for execution on a single processor; a processor for executing the target expert system program, the processor obtaining processing statistics in connection with each node of the RETE network during the execution; a beta-token partitioning expert system for receiving processing statistics generated by the processor during execution of the target expert system program, the programmed beta-token partitioning expert system identifying nodes in the RETE network for beta-token partitioning; and a multiprocessor compiler responsive to the node identifications by the beta partitioning expert system for compiling the target expert system program to form a RETE network for execution on multiple processors, the multiprocessor compiler generating a RETE network that is beta-token partitioned at the nodes identified by the beta-token partitioning expert system. In the system, the beta-token partitioning expert system comprises a beta opinion value generating portion responsive to processing statistics for generating, for each node in the RETE network, an opinion value; and a beta decision value generating portion responsive to the beta opinion values for nodes in the RETE network defining a rule for generating a beta-token partition decision value for the rule.

In yet another aspect, the invention provides a computer program for use in connection with a computer. The program includes a uniprocessor compiler for enabling the computer to compile a target expert system program to form a RETE network for execution on a single processor; a module for enabling the computer to execute the target expert system program, the computer obtaining processing statistics in connection with each node of the RETE network during the execution; a beta-token partitioning expert system module for enabling a computer to receive processing statistics generated by the processor during execution of the target expert system program, the beta-token partitioning expert system identifying nodes in the RETE network for beta-token partitioning, and a multiprocessor compiler module for enabling the computer to, in response to the node identifications by the beta-token partitioning expert system for compiling the target expert system program, form a RETE network for execution on multiple processors, the multiprocessor compiler module enabling the computer to generate a RETE network of the target expert system program that is beta-token partitioned at the nodes identified by the beta-token partitioning expert system. The beta-token partitioning expert system module comprises a beta opinion value generating portion for enabling the processor to generate, in response to processing statistics, a beta opinion value for each node in the RETE network; and a beta decision value generating portion for enabling the processor to generate, in response to the beta opinion values for nodes in the RETE network defining a rule for, a beta-token partition decision value for the rule.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3A depicts a flow chart describing the operations of beta and rule partitioning performed in connection with the invention;

FIGS. 3B-1 and 3B-2 depict data structures useful in understanding beta partitioning in accordance with the invention;

FIGS. 3C-1 through 3C-5 depict beta-token partitioning opinion rules and FIGS. 3D-1 through 3D-4 depict beta decision rules, all of which are useful in connection with the beta-token partitioning in accordance with the invention;

FIGS. 4A and 4B depict portions of a RETE network which is useful in understanding rule partitioning in accordance with the invention;

FIGS. 5 and 6 depict data structures which are used in rule partitioning in accordance with the invention; and FIGS. 7A and 7B depict a flow chart describing the operation of rule partitioning in accordance with the invention.

DETAILED DESCRIPTION OF AN ILLUSTRATIVE EMBODIMENT

Figure 1:
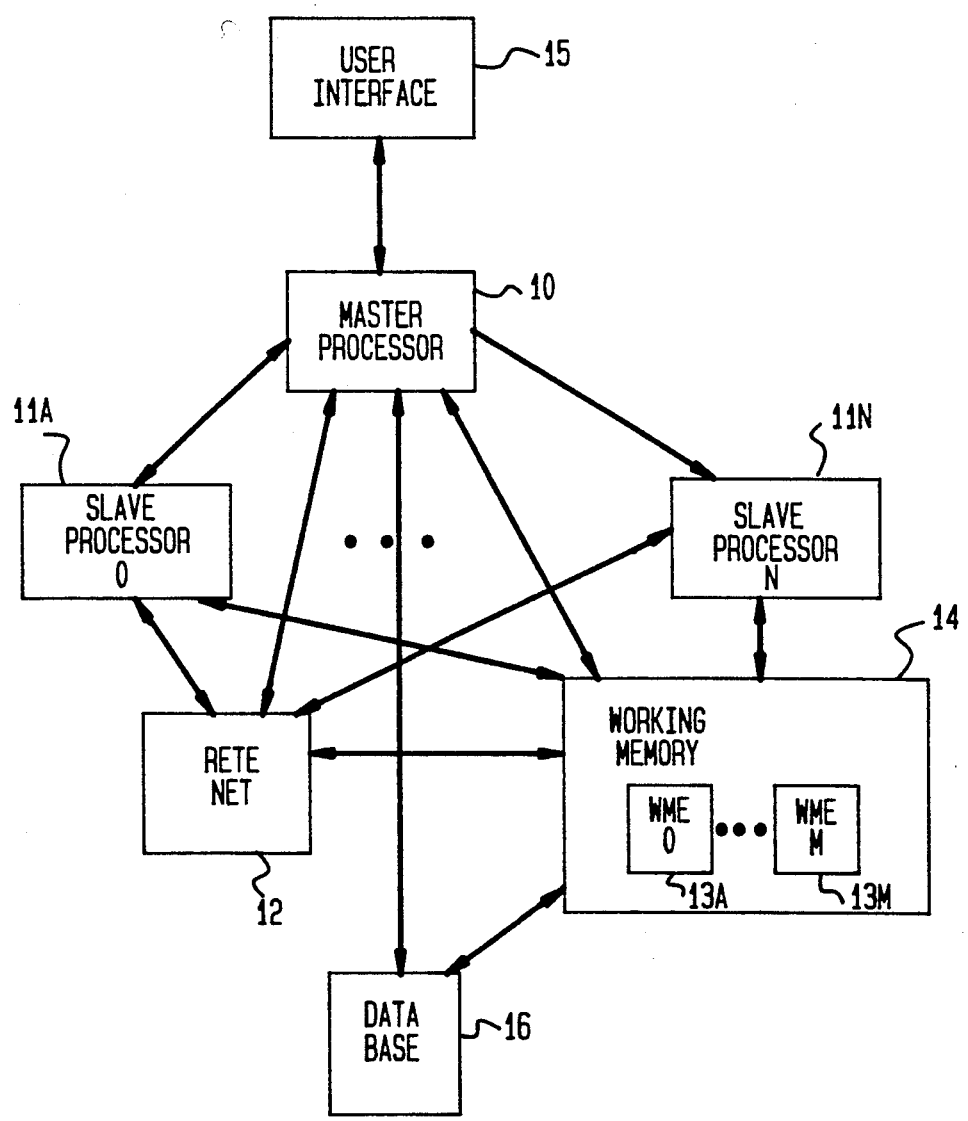
FIGS. 1 and 2 depict an expert system with respect to which the invention is used.
Figure 2:
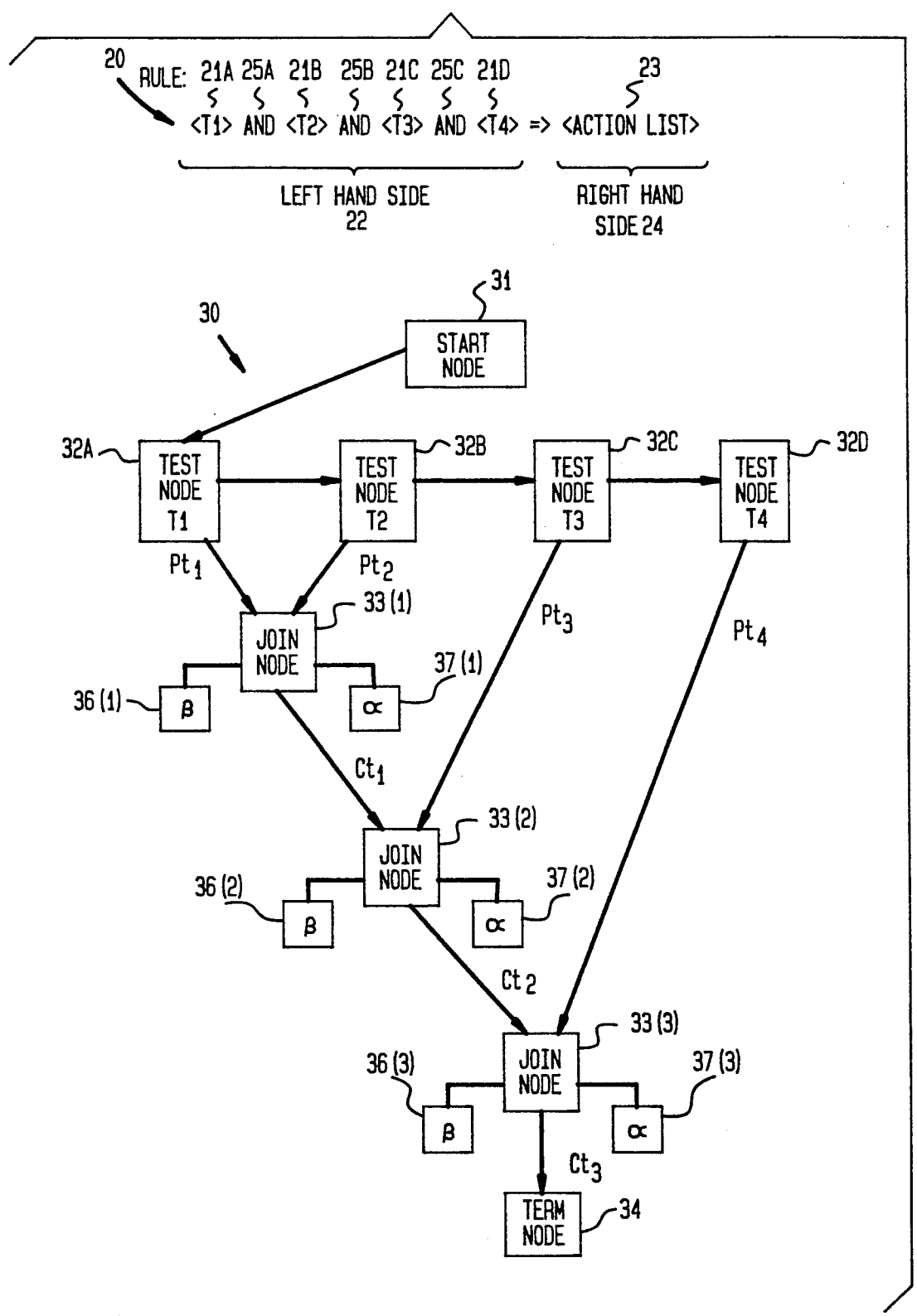

By way of background, the invention is useful in connection with an expert system such as depicted in FIGS. 1 and 2. With reference to FIG. 1, the expert system includes a master processor 10 and a plurality of slave processors 11A through 11N (generally identified by reference numeral 11) that process rules organized in a RETE network 12 using working memory elements 13A through 13M (generally identified by reference numeral 13) in a working memory 14 and information provided by an operator at a user interface 15. The master processor 10 enables the system to be initialized, including the creation of an initial set of working memory elements 13 in the working memory 14 based on data in a database 16. In addition, the master processor 10 enables the slave processors 11 to operate to process the working memory elements 13 in relation to the rules in the RETE network 12. It will be appreciated that, during the rule processing operations, the master processor 10 may also assist in the rule processing operations, operating effectively as another slave processor 11.

The slave processors 11 process the rules organized in the RETE network 12 in an inference cycle. That is, in response to a change in the working memory elements 13 in the working memory 14, which may result from, for example, the creation of a new working memory element 13 by the deposit of information by the operator at the user interface 15, or by the creation of one or more working memory elements 13 by the firing of a rule in the RETE network 12 during a previous inference cycle, the slave processors 11 process the rules in the RETE network 12 using the working memory elements 13 then in the working memory 14, select one rule to execute, or fire, and perform actions identified in the rule. The actions may include, for example, deposit of a new working memory element 13 in the working memory 14, deletion of a working memory element 13 from the working memory 14, modification of a working memory element 13, transmission of a message to the user interface 15 for display to an operator, termination of operation, and the like. The system may iteratively perform one or a number of inference cycles, until either (1) no rule remains that has all of its conditions satisfied, or (2) one of the actions specified by a rule selected to fire is a termination of operation. At that point, the system may wait for the operator to deposit further information, thereby creating a change of the working memory elements 13 in the working memory 14, before beginning another inference cycle.

As noted above, the rules are organized in the form of the RETE network 12. By way of background, one example of a rule and its RETE network equivalent are shown in FIG. 2. With reference to FIG. 2, the rule, identified by reference numeral 20, includes one or more conditions 21A through 21D (generally identified by reference numeral 21) and logical connectors 25A through 25C (generally identified by reference numeral 25) that define logical relationships among the conditions 21, all of which are collectively identified as its "left hand side" 22, and an action list 23 comprising its "right hand side" 24. During an inference cycle, the set of conditions 21 comprising the left hand side 22 and the logical relationships defined by the logical connectors 25 are tested against the working memory elements 13 contained in the working memory 14 to identify those rules 20 whose left and sides are satisfied. Those rules 20 whose left hand sides are satisfied are said to be in condition for firing.

After all of the rules have been processed to identify those in condition for firing, conflict resolution information (not shown), which may be included with the rules, is used to identify which rule of the one or more of the rules 20 that are in condition for firing will actually be fired. In firing a rule 20, one or more operations, as defined in the action list 23 comprising the rule's right hand side 24, are performed to complete the inference cycle. If the firing results in a creation, deletion or modification of a working memory element 13, another inference cycle may be performed to process the rules comprising the RETE network 12 in connection with the new collection of working memory elements 13.

The portion 30 of the RETE network 12 for the rule 20 is also shown in FIG. 2. The portion 30 includes a plurality of nodes, including a start node 31, a test node list 32 comprising one or more test nodes 32($i$) ["i" being an integer; four test nodes, identified by reference numerals 32(1) through 32(4), are shown in FIG. 2], one or more join nodes 33(1) through 33(3) (generally identified by reference numeral 33) and a terminal node 34. Each of the test nodes 32 corresponds to a test of one of the conditions 21 in the left hand side 22 of the rule. Similarly, each join node 33 corresponds to a logical connector 25 in a rule. The last join node 33(3) in the sequence connects to the terminal node 34, which effectively represents the rule's action list 23.

In one embodiment of the RETE network 12, the test node list 32 essentially forms a linked list, and the start node 31 contains a pointer identifying a first test node 32(1) in the list 32. Each test node 32($i$), in turn, contains a pointer to a subsequent test node 32($i+1$), with the last test node 32 containing, instead of a pointer to a subsequent test node, a value identifying it as the last test node in the list 32. Each est node 32($i$), in turn, defines a test condition and also contains a pointer to a join node 33 defining a logical connector 25. The join node 33(1) defining the first logical connector 25A in the rule 20 is pointed to by the test nodes 32(1) and 32(2) for the first two conditions in the rule, and the join node 33($i$) ("i" is an integer) for each subsequent logical connector 25($i$) is pointed to by the preceding join node 33($i$-1) and the test node 32($i+1$) for the condition 21($i+1$) in the rule 20 immediately after the logical connector 25($i$).

It will be appreciated that normally the expert system (FIG. 1) will include a number of rules, and the RETE network 12 will have a number of portions similar to portion 30 for the various rules. Typically, such a RETE network will have a plurality of test nodes 32($i$), one test node 32($i$) for each of the distinct conditions in the rules so that, if the same condition appears in multiple rules, the RETE network 12 will include only one test node 32($i$) therefor. In that case, the test node 32($i$) will have pointers to each of the join nodes 33 for the different rules, thereby enabling multiple rules to share test nodes 32($i$). In addition, join nodes 33 may be shared among rules if the same series of preceding join nodes and test conditions are used in multiple rules. The RETE network 12 thus facilitates sharing of test nodes 32($i$) and join nodes 33 among a plurality of rules, represented by terminal nodes 34.

In operation, the slave processors 11 use the pointer of the start node 31 to identify the test node list 32 containing test nodes 32($i$) representing the various conditions and test the test conditions pointed to thereby in connection with the working memory elements 13 in the working memory 14. If a working memory element 13 satisfies a test condition of a test node, the slave processor 11 generates a primitive token $Pt_n$["n" corresponding to the test node 32($i$) in response to which the primitive token was generated] and deposits it in a beta memory 36($i$) (generally identified by reference numeral 36) or an alpha memory 37($i$) (generally identified by reference numeral 37), both of which are associated with the join node 33($i$) identified by the test node 32($j$) ("j" comprising an integer). If, as in the case with test node 32(1), the test condition 21 in the rule 20 is to the left (as shown in FIG. 2) of the logical connector 25 represented by join node 33, the primitive token $Pt_n$ is deposited in the beta memory 36 of the join node 33. Otherwise, as is the case with test nodes 32(2) through 32(4), if the test condition 21 is to the right (as shown in FIG. 2) of the logical connectors 25A through 25C represented by join nodes 33(1) through 33(3), respectively, the primitive tokens $Pt_n$ are deposited in the alpha memories 37 of the respective join nodes 33(1) through 33(3).

In particular, with reference to the example shown in FIG. 2, if the slave processor 11 processing the condition identified by the test node 32(1) determines that a working memory element 13 satisfies the condition, it generates a primitive token $Pt_1$, which it loads into the beta memory 36(1) associated with the join node 33(1). The primitive token $Pt_1$ identifies the working memory element 13 that satisfied the condition. If multiple working memory elements 13 satisfy the condition, the slave processor 11 generates multiple primitive tokens for storage in the beta memory 36. Similarly, if a slave processor 11 processing the condition identified by the test node 32(2) determines that one or more working memory elements 13 satisfy the condition identified by that test node, it generates corresponding primitive tokens $Pt_2$, which it loads into the alpha memory 37(1) associated with the join node 33(1). The slave processors 11 processing the conditions identified by the remaining test nodes 32(3) and 32(4) associated with portion 30, perform similar operations, loading primitive tokens into alpha memories 37(2) and 37(3) associated with the join nodes 33(2) and 33(3), respectively. The slave processors 11 perform similar operations in connection with rules defined by all of the portions of the RETE network 12.

The slave processors 11 may perform the test operations defined by the test nodes 32(i) on the working memory elements 13 in parallel. The test nodes 32(i) may be apportioned among slave processors 11 by any scheme, such as by round-robin allocation of portions 30 to the various slave processors 11, and each slave processor 11 may perform the test operations in connection with all of the working memory elements 13.

After the slave processors 11 have tested at least some of the working memory elements 13 in relation to the test nodes 32, and deposited the requisite primitive tokens $Pt_n$ in the respective memories 36 or 37 of the join nodes 33, they proceed to perform tests defined by the successive join nodes 33(1) through 33(3) to identify sets of working memory elements 13 that satisfy each succeeding logical connection identified by the join nodes 33. As a slave processor 11 performs the test for the logical connection defined by a join node 33, it generates one or more complex tokens $Ct_n$ identifying combinations of working memory relations or elements 13 which satisfied the test. For example, a slave processor 11 processing the join node 33(1) (FIG. 2) generates complex tokens $Ct_1$, which it deposits in the beta memory 36 of the join node 33(2). Each complex token $Ct_1$ identifies a pair of working memory relations or elements 13 which jointly satisfy the logical operation defined by the logical connector 25A represented by the join node 33(1).

The slave processors 11 process the other join nodes 33(2) and 33(3) in a similar manner. In the case of join node 33(2), the slave processors 11 perform the logical operation defined by the logical connector 25B in connection with the complex tokens $Ct_1$ in the beta memory 36(2) of the join node 33(2) and the primitive tokens $Pt_3$ in its alpha memory 37(2) to generate complex tokens $Ct_2$. Each complex token $Ct_2$ identifies groups of working memory relations or elements 13, which are jointly identified by a complex token $Ct_1$ in the beta memory 36(2) of the join node 33(2), and primitive tokens $Pt_3$ in the alpha memory 37(2) of the join node 33(2), that jointly satisfy the logical operation defined by the logical connector represented by the join node 33(2). The slave processors deposit the complex tokens $Ct_2$ in the beta memory 36(3) of the join node 33(3).

Similarly, in the case of join node 33(3), the slave processors 11 perform the logical operation defined by the logical connector 25C in connection with the complex tokens $Ct_2$ in the beta memory 36(3) of the join node 33(3) and the primitive tokens $Pt_4$ in the alpha memory 37(30 of the join node 33(3) to generate complex tokens $Ct_3$. Each complex token $Ct_3$ identifies groups of working memory or relations elements 13, which are jointly identified by a complex token $Ct_2$, in the beta memory 36(3) of the join node 33(3), and primitive token $Pt_4$ in the alpha memory 37(3) of the join node 33(3), that jointly satisfy the logical operation defined by the logical connector 25 represented by the join node 33(2). The slave processors 11 deposit the complex tokens $Ct_3$ in terminal node 34.

Each complex token $Ct_3$ in the terminal node 34 represents an instantiation of the rule represented by the terminal node 34. That is, each complex token $Ct_3$ represents a combination of working memory elements 13 that satisfies the rule. The slave processors 11 identify the terminal nodes 34 representing the rules in the expert system that have complex tokens, and perform conflict resolution operations in connection with those rules, to identify one or several instantiations to fire. In selecting an instantiation to fire, the slave processors 11 use conflict information (not shown) which may accompany the various rules in a conventional manner.

The invention provides a beta-token partitioning system, generally depicted in the figures including and following FIG. 3A, to enhance the processing of the RETE network 12 in parallel by the various slave processors 11. Beta-token partitioning in a RETE network is generally described in the aforementioned U.S. patent application Ser. No. 103,364, filed Sept. 30, 1987, in the name of William Barabesh and William S. Yerazunis and entitled "Method For Operating A Parallel Processing System And Related Apparatus" now U.S. Pat. No. 4,965,882. As described therein, in beta-token partitioning, processing of the working memory elements 13 defined by the tokens $Pt_n$ or $Ct_n$ in either the beta or alpha memories of one join node 33 in one or more of the rules is divided among the respective slave processors 11. Thus, beta-token partitioning effectively enables the contents of either a beta or alpha memory 36 or 37 at a join node 33 to be divided among the various slave processors 11 during processing of the target expert system program defined by the RETE network. In the aforementioned application, the beta-token partitioning is described as being performed on the first join node 33(1) in all of the rules, but it notes that partitioning may be performed on any join node 33.

In accordance with the invention, an expert system beta-token partitioner is provided which identifies an optimum join node 33 at which beta-token partitioning is performed. That is, the expert system beta-token partitioner may, based on application of predetermined heuristic criteria, identify, for a particular rule, a join node 33 as a candidate for beta-token partitioning, and particularly may indicate whether beta-token partitioning should be performed on the join node's beta memory 36 or its alpha memory 37. On the other hand, if, upon application of the heuristic criteria, no join node 33 is identified, no beta-token partition occurs in the rule. For those rules in which no beta-token partition occurs, a rule partition operation may be performed, as described below in connection with FIGS. 4A through 7, to fairly divide processing of those rules among the various slave processors 11.

With reference to FIG. 3A, to accommodate the beta-token partitioning, the target expert system program, that is, the expert system program which is to undergo beta-token partitioning, is compiled, in a conventional manner, to run on in a digital data processing system comprising a single processor (step 100). The compiled target expert system program includes directives to facilitate collection of a number of statistics regarding processing at each node during execution of the compiled target expert system program by the single processor. The processing statistics that are collected during execution will be described below in detail particularly in connection with FIG. 3B-1. Briefly, the processing statistics include such information as the number of primitive and complex tokens $Pt_n$ and $Ct_n$ received in the beta and alpha memories of each of the join nodes 33, the number of comparisons performed in connection with processing of the join nodes 33 in generating the complex tokens $Ct_n$, the number of complex tokens $Ct_n$ emitted by each of the join nodes 33, and the amount of processor time spent at each join node 33.

After the target expert system program undergoing beta-token partitioning is compiled, it is run, on a digital data processing system including a single processor, one or more times to facilitate the collection of the processing statistics (step 101). After processing statistics have been collected, they are analyzed by the beta-token partitioning expert system, which is described below in connection with FIGS. 3A through 3D-4 to locate a join node 33 which is optimal, based on knowledge embedded in the expert system, for beta-token partitioning (step 102).

If the beta-token partitioning expert system determines that a rule contains no join node 33 optimal for beta-token partitioning (step 103), the rule is placed in a group to be executed on a single processor. Alternatively, the collection of rules which are not beta-partitioned may instead be rule-partitioned by a rule-partitioning system, such as described below. After the processing statistics for all of the rules have been processed in this manner, a rule partitioning operation is performed on the rules in the group for rule partitioning, that is, on all of the rules that did not contain any join nodes optimal for beta-token partitioning (step 104). After the beta-token partitioning operations have been completed in step 103, or after the rule-partition operations have been performed in step 104, the expert system program is then re-compiled for execution in a digital data processing system containing multiple processors (step 105).

Beta-Token Partitioning Expert System

The beta-token partitioning expert system will be described in connection with FIGS. 3B-1 through 3D-4. FIGS. 3B-1 and 3B-2 depict data structures for two types of working memory elements used by the beta-token partitioning expert system. In one specific embodiment, the processing statistics are separately maintained for each activation of a join node, that is, for each of the beta and alpha memories 36 and 37, and the beta-token partitioning expert system separately processes the statistics for the two sides as separate nodes to determine whether partitioning should occur in connection with the contents of the beta or alpha memory 36 or 37 of a rule. FIG. 3B-1 depicts the data structure of a node activation data structure 120 for each node activation. For each target expert system rule undergoing beta-token partitioning processing, the beta-token partitioning expert system generates a rule data structure 150, which is depicted in FIG. 3B-2, which effectively stores status for the target expert system rule.

FIGS. 3C-1 through 3C-5 depict beta-token partitioning opinion rules that are applied to node activation data structures 120 which store processing statistics for each of the node activations to effectively generate raw partitioning scores. The raw partitioning scores are processed by beta decision rules, depicted in FIGS. 3D-1 through 3D-5, to determine, in each rule, where, if anywhere, beta-token partitioning should be performed. The application of the beta decision rules results in the generation of a rule data structure 150 defining a rule for each of the target expert system rules being processed. In addition, control rules, not shown, may be provided to perform various control functions in connection with the beta-token partitioning expert system, such as eliminating node activation data structures 120 not necessary for further processing, display of results, and so forth.

With this background, and with reference to FIG. 3B-1, a node activation data structure 120, includes a plurality of fields. A rule identification field 121 contains a rule identification value that identifies the rule in the target expert system program that is undergoing beta-token partitioning. A node identification field 124 contains a node identification value which identifies the join node 33 to which each node activation data structure relates among node activation data structures 120 for the node activations for all of the join nodes 33 in the target expert system program. A node number field 125 receives a value identifying the position of the join node 33 in the sequence relative to the other join nodes of the rule identified by the contents of the rule identification field 121; the contents of the node number field effectively identifies the location of the logical connector 25 in the rule 20 (FIG. 2A) associated with the node activation data structure 120. A left/right side field 123 receives a value that associates the node activation data structure 120 with the beta memory 36 (which is situated to the left, as shown in FIG. 2) or alpha memory 37 (which is situated to the right, as shown in FIG. 2) of the node 33. Thus, the combined contents of the rule identification field 121, node number field 125 and left/right side field 123 jointly identify the node activation of the node activation data structure 120 among all node activations for the target expert system program whose processing statistics are being processed by the beta-token partitioning expert system. Otherwise stated, the three fields 121, 125 and 123 jointly identify the node activation among all node activations for the target expert system program whose processing statistics are being processed. In one embodiment, the contents of the node identification field 124 relates the join node 33 associated with the node activation data structure 120 to the particular format of the processing statistics generated during test execution of the compiled target expert system program (step 101, FIG. 3A).

The node activation data structure 120 also includes a node type field 122 which identifies the logical connector 25 associated with the join node 33 with which the data structure is associated. Several types of logical connectors 25 may be provided, including, for example, an AND connector and a NOT connector. An AND connector in a rule in the target expert system program undergoing beta-token partitioning is satisfied if the conditions 21 preceding the AND connector, as linked by their respective logical connectors 25, are satisfied by the contents of the working memory 14 and if the working memory 14 contains a working memory element 13 which satisfies the condition after the AND connector 25. A NOT connector, on the other hand, is satisfied if the working memory 14 contains working memory elements 13 which satisfy the conditions, as linked by their respective connectors 25, preceding the NOT connector, but no working memory element 13 which satisfies the specific condition immediately following the connector.

The node activation data structure 120 also includes two sets of fields for receiving processing statistics. Several types of processing statistics are maintained that are separately related to each node activation, that is, that are separately related to each of the beta and alpha memories 36 and 37, including a "number of activations" value, a "number of emissions" value and a "number of comparisons" value. The "number of activations" value relates to the number of tokens, whether primitive tokens $Pt_n$ or complex tokens $Ct_n$ deposited in the beta memory 36, if the node activation data structure 120 relates to a left node activation, that is, a node activation testing a condition or conditions located to the left of a join node 33. Alternatively, if the node activation data structure 120 relates to a right node activation, the "number of activations" value relates to the number of primitive tokens $Pt_n$ in the alpha memory 37. The "number of emissions" value relates to the number of complex tokens $Ct_n$ that are generated and emitted while processing the join node 33, and the "number of comparisons" value relates to the number of comparisons performed during processing of the join node 33.

The node activation data structure 120 includes two sets of fields for these processing statistics. One set, comprising a total activation field 126, a total emission field 127 and a total comparisons field 130, receive processing statistics regarding total activations, emissions and comparisons performed in connection with the node activation over the entire time during which processing statistics were generated. On the other hand, a maximum activations field 131, maximum emissions field 132 and maximum comparisons field 133 receives processing statistics regarding the maximum number of activations, emissions and comparisons performed in any recognize/act cycle. The node activation data structure 120 includes a maximum time field 134, which identifies the maximum time spent during processing of the join node during a recognize/act cycle, and a total time field 135, which identifies the total amount of processing time spent by the processor in processing the join node 33.

The node activation data structure 120 further includes three fields for maintaining status information during processing of the beta-token partitioning expert system. An opinion field 136 holds a beta-token partitioning value, which is incremented or decremented as various tests, defined by the beta-token partition opinion rules (FIGS. 3C-1 through 3C-5), are applied. A decision field 137 holds a decision value which indicates whether the node activation should be beta-token partitioned; that is, the decision field 137 indicates whether the corresponding join node 33 is optimum for beta-token partitioning along the beta or alpha memory 36 or 37 associated with the node activation data structure 120. Finally, a flags field 140 contains a plurality of flags which are used in sequencing through the various beta-token partition opinion rules (FIGS. 3C-1 through 3C-5).

FIG. 3B-2 depicts the structure of a rule structure 150 generated for each of the rules of the target expert system program by the beta-token partition expert system. With reference to FIG. 3B-2, the rule data structure 150 includes a rule identification field 151 which stores a rule identification value that identifies the rule in the target expert system program undergoing beta-token partitioning. A partition type field 152 stores partition type information that indicates whether the beta-token partition expert system has determined that a join node 33 in the rule, identified by the contents of rule identification field 151, is optimal for beta-token partitioning. If the partition type field 152 indicates that the rule includes a join node that is optimal for beta-token partitioning, a level field 154 identifies the node number of the optimal join node 33 and a left/right side field 153 indicates whether the beta-token partitioning should be in connection with the join node's beta or alpha memory 36 or 37. If the partition type field 152 indicates that the rule be beta-token partitioned, an opinion field 156 identifies an opinion value. The opinion value is copied from the opinion field 136 of the node activation data structure 120 associated with the node at which beta-token partitioning is to occur.

As described above, for those rules indicated by the beta-token partition expert system as not having join nodes 33 optimal for beta-token partitioning, a rule partitioning operation is performed. The rules are partitioned into one or more groups to accommodate maximal concurrent processing. A group field 155 is provided in the rule data structure 150 for the rules on which rule partitioning is performed. It identifies a rule partition group to which the rule is assigned during rule partitioning. Finally, the rule data structure 150 includes a flags field that contain various control flags as described below.

As noted above, the beta-token partitioning expert system includes three types of rules, including the beta-token partitioning opinion rules depicted in FIGS. 3C-1 through 3C-5, the beta decision rules depicted in FIGS. 3D-1 through 3D-5, and the control rules (not shown) that enable selected input/output and control operations, a complete description of which is not necessary to the understanding of the invention or the embodiment described herein.

To control use of the beta-token partitioning opinion rules, beta decision rules and control rules, the beta-token partitioning expert system includes several working memory elements defining contexts. One such working memory element is a BETA_HEURISTICS context, which, if it contains the value ACTIVE, enables use of the beta-token partitioning opinion rules. Otherwise stated, each of the beta-token partitioning opinion rules includes a condition that the BETA_HEURISTICS working memory element contain the value ACTIVE; if the BETA_HEURISTICS working memory element does not contain the value ACTIVE, the beta-token partitioning opinion rules can not fire. The beta-token partitioning expert system also includes a working memory element comprising a MAKE_BETA_DECISIONS context, which, if it contains the value ACTIVE, permits the beta decision rules to fire. Other working memory elements define other contexts used by the control rules.

With this background, and with reference to FIG. 3C-1 through 3C-5, the beta-token partitioning expert system includes thirteen beta-token partitioning opinion rules, identified as rules H1 through H13, each of which modifies the value of the contents of the opinion field 136 in response to the results of various tests, each defined by one of the beta-token partitioning opinion rules. The node activation data structure 120 for each node activation includes control flags, maintained in field 140 (FIG. 3A), to ensure that the rules fire only once for each node activation data structure 120.

Figure 3:
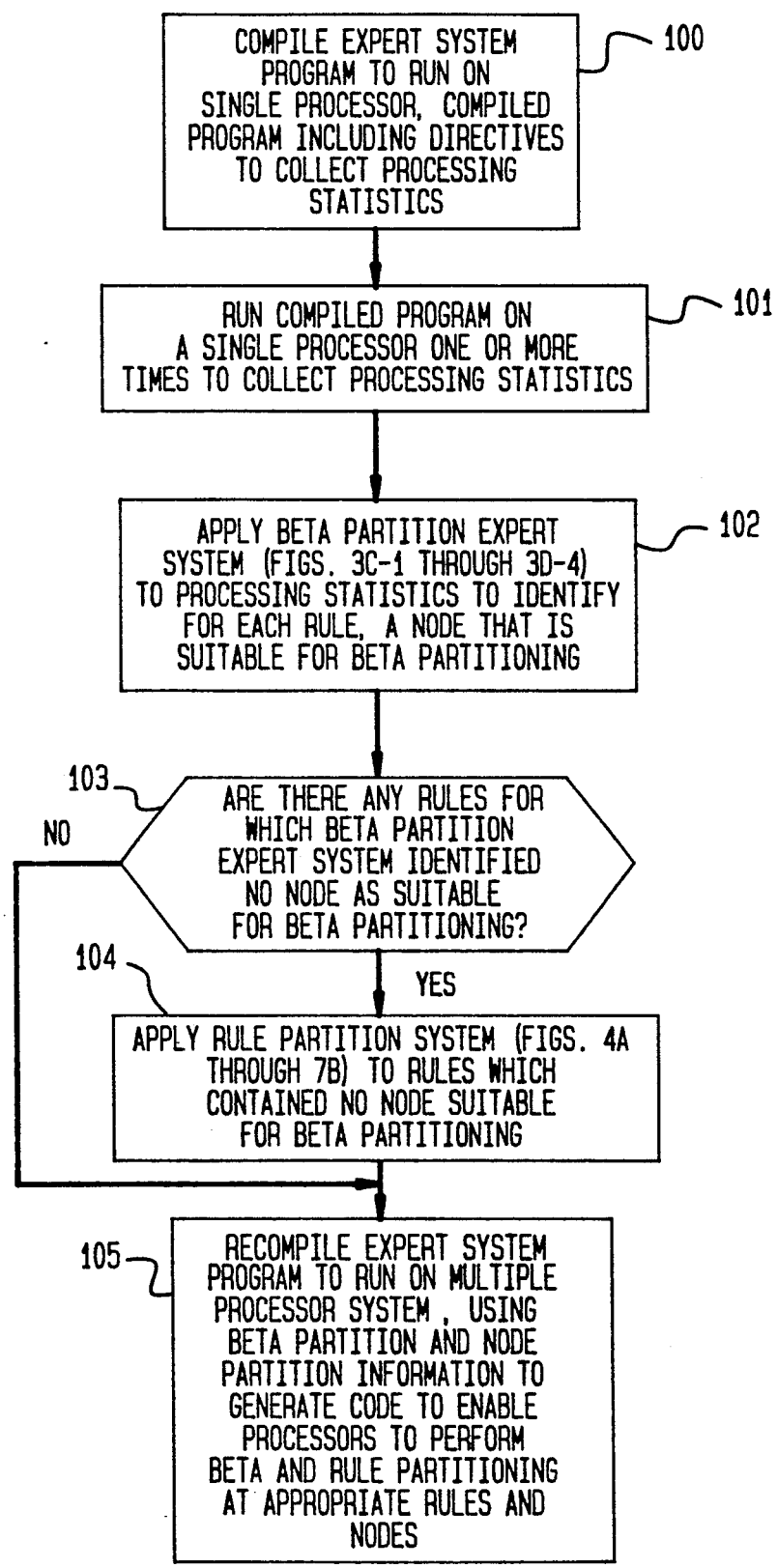
Figures 2, 3B:
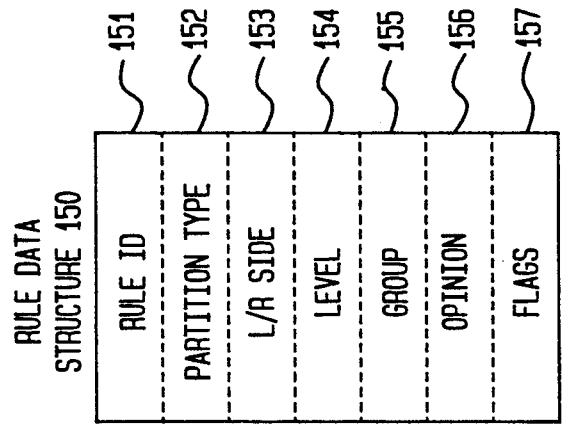
Figures 1, 3B:
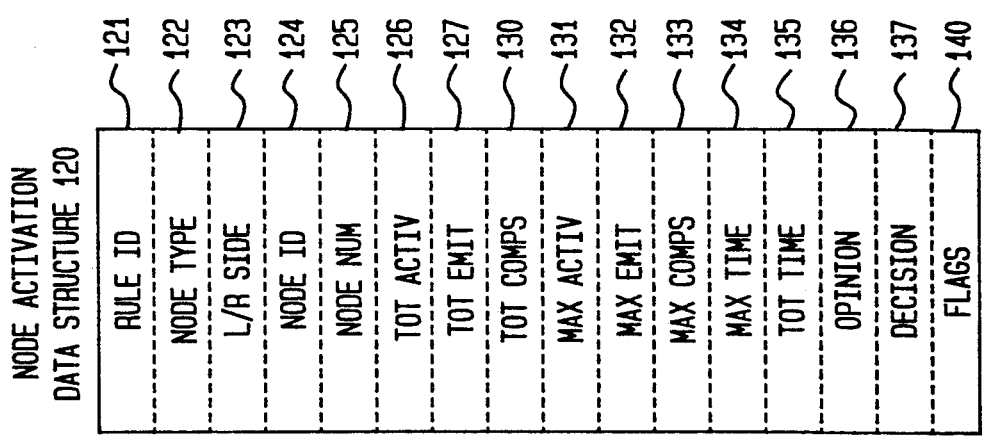

With reference to FIG. 3C-1, rule H1 is used to provide that beta-token partition does not occur in connection with node activations for join nodes that are of type NOT. More specifically, if a node activation, identified in FIGS. 3C-1 through 3C-5 as "<THE_NODE>" of a join node 33 in a specific rule "RULE_ID=<PR>", has a node activation data structure 120 whose node type field 122 contains a value NOT, and the flags field 140 contains an empty T1 flag, indicating that rule H1 has not been applied, the conditions of the rule H1, which are set forth in the portion of the rule following "IF", the rule fires. In that case, the operations defined in the portion of the rule following "THEN" are performed. In that case, the opinion field 136 of the node activation data structure 120 of the node activation "<THE_NODE>" is loaded with a large negative value, in one embodiment a value "−1000". This value is selected to ensure that application of the beta decision rules will not select the node as optimum for beta-token partitioning, even if application of other rules may modify this value. The firing also results in setting of the flag T1 in the flags field 140 of the node activation's node activation data structure 120; since the rule's conditions require that the flag T1 must be clear for the rule to fire, the setting of the T1 flag ensures that the rule is applied at most once to a node activation.

Rule H2 is provided to mildly reduce the likelihood of beta-token partitioning in connection with left node activations that relate to the first join node (33(1)) in the sequence of join nodes associated with a rule 20 in the expert system program, that is, those node activations associated with node activation data structures 120 having value "1" in their node number fields 125 and value "L" in their left/right side fields 123. A flag T9, maintained in flags field 140 of each node activation data structure 120, controls firing of rule H2. If the contents of the node activation data structure 120 for the node activation "<THE_NODE>" causes the rule H2 to fire, the contents of the opinion field 136 are decremented by value "1". In addition, the flag T9 is set in the node activation data structure 120 so that the node activation data structure 120 does not cause the rule H2 to fire again.

Rule H3 relates to a comparison between left and right node activations for a single node in a single rule of the target expert system program undergoing beta-token partitioning. Rule H3 is provided to increase the likelihood of beta-token partitioning of a node activation, identified by "<THE_NODE>", if the number of comparison operations performed in connection with the opposite side node activation of the join node 33 during the generation of processing statistics is above a threshold value. The threshold value, identified in the rule H3 as a parameter PARAM<GOOD_MAX­_COMPS>, in one embodiment is computed as ten times the number of processors for which the target expert system program is to be compiled for execution. Rule H3 fires for two node activations represented by node activation data structures 120 if the maximum comparisons field 136 associated with the opposite side node activation has a value greater than PARAM<GOOD_MAX_COMPS> and if their rule identification fields 121 contain the same values, node number fields 125 contain the same values, and left/right side fields 123 contain opposing (that is, "LEFT" versus "RIGHT") values. These three conditions ensure that two node activation data structures 120 are related to opposing node activations for the same rule 20 (as identified by the contents of the rule identification fields 121) and join node 33 (as identified by the contents of the node number fields 125). In addition, the node activation "<THE_NODE>" must have a node type of AND and a clear flag T2 for the beta-token partitioning opinion rule H3 to fire. If the beta-token partitioning opinion rule H3 fires, the contents of the opinion field 136 of the node activation data structure 120 of the node activation "<THE_NODE>" are incremented by seven, and the flag T2 is set so that the rule does not fire in connection with that node activation data structure 120 again.

Rule H4 is provided to test the contents of the maximum comparisons field 136 of a node activation whose left/right side field contains the value "RIGHT" to determine whether they exceed the parameter PARAM<GOOD_MAX_COMPS> and to increase the value of the contents of the opinion field 136 of the parent node activation (which is defined below) having the larger value in its maximum comparisons field 133. With reference to FIG. 3C-2, the rule H4 contains three conditions, each relating to a node activation represented by a node activation data structure 120.

The first condition of beta-token partitioning opinion rule H4 is the existence of a node activation "<THE_NODE>" having a node activation data structure 120 whose left/right side field contains the value "RIGHT", indicating that the node activation is a right side activation, whose node type field 122 contains the value AND, whose maximum comparisons field contains a value greater than PARAM<GOOD_ MAX_COMPS>, and whose flags field 140 contains a clear flag T8.

The second and third conditions of beta-token partition opinion rule H4 are the existence of parent node activations, that is, the existence of node activation data structures 120 whose rule identification fields 121 contain values that identify the same target expert system program rule as that identified by the node activation data structure of the node activation "<THE_NODE>" and whose node number fields 125 contain values one less than the contents of the node number field 125 of the node activation data structure 120 of the node activation "<THE_Node>". If all three conditions of beta-token partition opinion rule H4 are satisfied, the rule fires thereby increasing by a value "five" the contents of the opinion field 136 of the node activation data structure 120 of the parent node activation whose maximum comparisons field 133 contains the higher value are increased. In addition, flag T8 is set in flags field 140 of the node activation data structure 120 associated with the node activation "<THE_NODE>" to ensure that the rule does not fire again with the same set of node activation data structures 120.

The remaining beta-token partitioning opinion rules H5 through H13 are depicted in FIGS. 3C-3 through 3C-5 and will not be described in detail. Briefly, however, beta-token partition opinion rule H5 is provided to enable the decrement of the contents of the opinion field 136 of a node activation data structure 120 of a node activation "<THE_NODE>" if the contents of the maximum comparisons field is below a particular value, identified by parameter PARAM<BAD_MAX_COMPS>. In one particular embodiment, the parameter PARAM<BAD_MAX_COMPS> is computed to be three times the number of processors for which the target expert system program is to be compiled for execution, and firing of Rule H5 results in the contents of the opinion field 136 being decremented by a value of "four". Flag T3 in the flags field 140 of the node activation data structures 120 of the various node activations controls the application of the beta-token partition opinion rule H5.

Beta-token partitioning opinion rule H6 is provided to enable the increase of the contents of the opinion field 136 of the node activation data structure 120 of a node activation "<THE_NODE>" for a join node 33 if the node type field 122 of the node activation data structure 120 contains the value "AND" and if the contents of the maximum emissions field 132 are above a particular value, identified by a parameter PARAM<GOOD_MAX_EMITS>. In one particular embodiment, the parameter PARAM<GOOD_MAX_EMITS> is computed to be four times the number of processors for which the target expert system program is to be compiled for execution, and firing of Rule H6 results in contents of the opinion field 136 being incremented by a value of "five". Flag T4 in the flags field 140 of the node activation data structures 120 of the various node activations controls the application of the beta-token partitioning opinion rule H6.

Beta-token partitioning opinion rule H7 is provided to enable the increase of the contents of the opinion fields 136 of the node activation data structures 120 of a left node activation "<THE_Node>", and of its parent node activations, if the contents of the maximum activations field 131 of the node activation data structure 120 of the node activation "<THE_NODE>" are above a particular value, identified by a parameter PARAM<GOOD_MAX_ACTIV>. In one particular embodiment, the parameter PARAM<GOOD_MAX_ACTIV> is computed to be five times the number of processors for which the target expert system program is to be compiled for execution, and firing of Rule H7 results in he contents of the opinion field 136 of the node activation data structure 120 of the left node activation "<THE_NODE>" being incremented by a value "three" and the contents of the opinion fields 136 of its parent node activations being incremented by a value of "two". Flag T5 in the flags field 140 of the node activation data structures 120 of the various node activations controls the application of the beta-token partition opinion rule H7.

Beta-token partitioning opinion rule H8 (FIG. 3C-4) enables the increase of the contents of the opinion field 136 of the node activation data structure 120 of a right node activation if the node type field 122 contains the value "AND", and the maximum activations field 131 of its node activation data structure 120 contains a value greater than the parameter PARAM<GOOD_MAX_ACTIV>. In the embodiment described herein, in which the parameter PARAM<GOOD_MAX_ACTIV> is computed as described above, the firing of Rule H8 results in the contents of the opinion field 136 being incremented by a value of "four". Flag T5 in flags field 140 of the node activation data structures 120 of the various node activations controls the application of beta-token partitioning opinion rule H8.

Beta-token partitioning opinion rule H9 is provided to enable the increase of the contents of the opinion field 136 of the node activation data structure 120 of a node activation "<THE_NODE>" if the node type field 122 has a value AND, and the contents of the total emissions field 127 are above a particular value, identified by a parameter PARAM<GOOD_TOT_EMIT>. in one particular embodiment, the parameter PARAM<GOOD_TOT_EMIT> is computed to be ten times the number of recognize/act cycles covered by the processing statistics used in formation of the node activation data structures 120 for the node activations, and the firing of Rule H9 results in the contents of the opinion field 136 being incremented by a value of "two". Flag T6 in the flags field 140 of the node activation data structures 120 of the various node activations controls the application of the beta-token partitioning opinion rule H9.

Beta-token partitioning opinion rule H10 is provided to enable an increase of the contents of the opinion field 136 of the node activation data structure 120 of a node activation "<THE_NODE>" if the node type field 122 has a value "AND" and the contents of the total comparisons field 130 of the node activation data structure 120 of its sibling node activation, that is, the opposite side node activation relating to the same join node 33 (FIG. 2), has a value greater than a parameter PARAM<GOOD_TOT_COMPS>. In one particular embodiment, the parameter PARAM<GOOD_TOT_COMPS> has a value corresponding to one hundred times the number of recognize/act cycles covered by the processing statistics used in formation of the node activation data structure 120 for the node activations, and the firing of Rule H10 results in the contents of the opinion field 136 being incremented by a value of "four". Flag T7 in the flags field 140 of the node activation data structures 120 of the various node activations controls the application of the beta-token partitioning opinion rule H10.

Beta-token partitioning opinion rule H11 (FIG. 3C-5) is provided to enable a moderate increase of the contents of the opinion field 136 of the node activation data structure 120 of a node activation "<THE_NODE>" if the node type field 122 has a value "AND" and the contents of the maximum time field 134 of the same node activation data structure 120 have a value larger than the parameter PARAM<GOOD_MAX_TIME>. In one particular embodiment, the parameter PARAM<GOOD_MAX_TIME> has a value corresponding to one hundred times the number of processors for which the target expert system program is to be compiled for execution, and the firing of Rule H11 results in the contents of the opinion field 136 being incremented by a value of "four". Flag T11 of the flags field 140 of the node activation data structures 120 of the various node activations controls the application of the beta-token partition opinion rule H11.

Beta-token partitioning opinion rule H12 is provided to enable a moderate increase in the contents of the opinion field 136 of the node activation data structure 120 of a node activation "<THE_NODE>" if the node type field 122 has a value "AND" and the contents of the total time field 135 of the same node activation data structure 120 have a value larger than the parameter PARAM<GOOD_TOT_TIME>. In one particular embodiment, the parameter PARAM<GOOD_TOT_TIME> has a value corresponding to one hundred times the number of recognize/act cycles covered by the processing statistics used in formation of the node activation data structure 120 for the node activations, and firing of Rule H12 results in the contents of the opinion field 136 being incremented by a value of "three". Flag T12 of the flags field 140 of the node activation data structures 120 of the various node activations control the application of the beta-token partitioning opinion rule H12.

Finally, beta-token partitioning opinion rule H13 is provided to enable a small decrease in the contents of the opinion field 136 of the node activation data structure 120 of a node activation "<THE_NODE>" if the node type field 122 has the value "AND" and the contents of the total activation field 126 of the node activation data structure 120 have a value much larger than the value of the contents of the total emissions field 127 of the same node activation data structure 120. In one particular embodiment, the beta-token partition opinion rule H13 fires if the value in the total activation field 126 is greater than ten times the value in the total emissions field 127, and firing of Rule H13 results in the contents of the opinion field 136 being incremented by a value of "one". Flag T13 of the flags field 140 of the node activation data structures 120 of the various node activations controls the application of the beta-token partition opinion rule H13.

The six beta decision rules D1 through D6 are depicted in FIGS. 3D-1 through 3D-4. The beta decision rules are applied to the node activation data structures 120 for each rule 20 in the target expert system program and enable the comparisons of beta opinion values in the opinion fields 136 of various node activation data structures 120 of the node activations for each rule, both with each other and with selected threshold values. Generally, the beta decision rules determine that beta-token partitioning should not occur in connection with either:

(a) a node activation of a join node 33(i) whose node activation data structure 120 has an opinion field 136 that contains a beta opinion value that is less than a predetermined threshold value established by a para PARAM<GOOD_BETA_CONST>, or (b) if a node activation of a join node 33(i) whose node activation data structure 120 has an opinion field 136 that contains a beta opinion value that is greater than or equal to a predetermined threshold value established by a parameter PARAM<GOOD_BETA_CONST>, but the beta opinion value is less than or equal to the beta opinion value for a node activation of the next succeeding join node 33(i+1) less a difference parameter value PARAM<GOOD_BETA_DELTA>.

Otherwise stated, the beta decision rules determine that beta-token partitioning should not occur for a node activation whose associated beta opinion value is less than a minimum threshold value, or for a node activation which has an associated beta opinion value that is larger than, or equal to, the minimum threshold value but for which a node activation of the next join node has an associated beta opinion value that is greater than or equal to that for the node activation being tested by at least a second "delta" value.

Among the other node activations, the beta decision rules depicted on FIGS. 3D-1 through 3D-4 enable the identification of a node activation in the first of the successive join nodes 33 for a rule 25 that is optimum for beta-token partitioning. When that occurs, a rule data structure 150 is created for the expert system program rule as explained below.

The beta decision rules D1 through D6 are depicted in the FIGS. and each will only be briefly described here. With reference to FIG. 3D-1, beta decision rule D1 enables the comparison of the contents of the opinion fields 136 of the node activation data structures 120 of the node activations of the first and second join nodes 33 of an expert system program rule. If (1) the higher of the first level opinion values, that is, the higher of the values contained in the opinion field 136 of the node activation data structures 120 of left and right node activations of the first join node 33 is greater than or equal to a selected value, namely, a parameter PARAM<GOOD_BETA_CONST>,and (2) the values of the opinion fields 136 of the node activation data structures 120 of the left and right node activations of the second join node exceed the higher first level opinion value by less than a second value, identified by a parameter PARAM<GOOD_BETA_DELTA>, then the beta decision rule D1 fires. In one embodiment, the values of the parameters PARAM<GOOD_BETA_CONST> and PARAM<GOOD_BETA_DELTA> are supplied by the operator. In one specific embodiment, the parameter PARAM<GOOD_BETA_CONST> has a default value of "six" and the parameter PARAM<GOOD_BETA_DELTA> has a default value of "four".

If the beta decision rule D1 fires, the node activation of the first level join node 33 having the higher first level opinion value is deemed optimum for beta-token partitioning. The firing of the beta decision rule D1 results in loading of a number of additional values into the other fields of the rule data structure 150. In particular, a value BETA_PART_HERE is loaded into the decision field 137 of the node activation data structure 120 for that node activation to so indicate. In addition, a rule data structure 150 for a rule is created and the rule identification field 151 is loaded with a value to identify the target expert system program rule, taken from field 121 of the node activation data structure 120 of the node activation. A value "BETA" is loaded into the partition type field 152 to indicate that beta-token partitioning is to occur at that node activation. A value "1" is loaded into the level field 154, to indicate that the beta-token partition is to occur at the first join node 33 associated with the rule 25. The contents of the left/right side field 123 of the node activation data structure 120 for the node activation are copied into the left/right side field 153 of the newly-created rule data structure 150, to further identify the node activation at which beta-token partitioning is to occur. In addition, the contents of the opinion field 136 of the node activation data structure 120 for the node activation are copied into the opinion field 156 of the newly-created rule data structure 150.

Beta decision rule D2 (FIG. 3D-2) enables the comparison of the contents of the opinion fields 136 of the node activation data structures 120 of the left and right side node activations at the first join node 33 of a rule 20, and fires if (1) the value of the higher is greater than or equal to the value of parameter PARAM<GOOD_BETA_CONST>, and (2) there are no node activation data structures 120 of node activations of a second join node 33, which occurs if the expert system program rule does not contain any second join nodes 33. The firing of the beta decision rule D2 results in the same operations as does firing of beta decision rule D1.

Beta decision rule D3 enables the comparison of the contents of the opinion fields 136 of a node activation data structure 120 with the parameter PARAM<GOOD_BETA_CONST> and fires if the contents of the opinion fields 136 are lower than the value of the parameter. The firing of the beta decision rule D3 results in the loading of a decision value "NO" in the decision field 137 of the node activation data structures 120. Thus, if the value in the opinion field 136 of the node activation data structure 120 of any node activation is lower than the value of the parameter PARAM<GOOD_BETA_CONST>, beta-token partitioning does not occur at that node activation.

Beta decision rule D4 (FIG. 3D-3) enables a comparison between the contents of the opinion fields 136 of node activation data structures 120 for node activations for two succeeding join nodes 33. Beta-token partition rule D4 fires if the contents of the opinion field 136 of the node activation data structure 120 for the node activation of the first join node $33(i)$ equals or exceeds the value of the parameter PARAM<GOOD_BETA_CONST>, and if the contents of that for the second join node $33(i+1)$ exceeds that value by the value of the parameter PARAM<GOOD_BETA_DELTA>. The firing of the beta decision rule D4 results in the loading of a decision value "NO" in the decision field 137 of the node activation data structure 120 of the node activation of the first join node $33(i)$. The effect of the beta decision rule D4 is that, if the beta opinion value of a node activation of one join node $33(i)$ indicates that it is a candidate for beta-token partitioning, but the beta opinion value of either node activation of the next succeeding join node $33(i+1)$ indicates that it is a better candidate, by at least the value of the parameter PARAM<GOOD_BETA_DELTA>, then beta-token partitioning should not occur at the node activation for the one join node $33(i)$.

Beta decision rule D5 enables a comparison of the beta opinion values in the opinion fields 136 of node activation data structures 120 of node activations for the same join node $33(i)$, if the beta decision value "NO" is contained in the decision fields 137 of the node activation data structures 120 of node activations for the preceding join node $33(i-1)$ and there are no succeeding join nodes $33(i+1)$. If the larger of the beta opinion values is greater than or equal to the value of the parameter PARAM<GOOD_BETA_CONST>, the beta decision rule D5 fires, and the operations describe above in connection with beta decision rule D1 are performed.

Beta decision rule D6 (FIG. 3D-4) is essentially directed to node activations between the first several join nodes 33 in an expert system program rule 25, which are covered by beta decision rules D1 and D2, and the last join node 33 in a target expert system program rule 25, which is covered by beta decision rule D5. The beta decision rule D6 enables the testing of conditions relating to (1) the contents of the decision fields 137 of the node activation data structures 120 of the node activations of preceding join nodes $33(i-1)$ to determine if they both contain the value "NO", indicating that they are not optimum for beta-token partitioning, (2) the beta opinion values contained in the opinion fields 136 of the node activation data structures 120 of the node activations of the join nodes $33(i)$ to determine if the larger beta opinion value is greater than or equal to the value of parameter PARAM<GOOD_BETA_CONST>, and (3) beta opinion values contained in the opinion fields 136 of the node activation data structures 120 of the node activations of the succeeding join nodes $33(i+1)$ to determine if they are both less than the sum of (a) the larger of the beta opinion values for the node activations of the join nodes $33(i)$ and (b) the value of parameter PARAM<GOOD_BETA_DELTA>. If the beta decision rule D6 fires, the operations described above in connection with beta decision rule D1 are performed in connection with the node activation data structure 120 of the node activation of the join node $33(i)$ which has the higher beta opinion value.

It will be appreciated by those skilled in the art that, while the beta-token partitioning expert system has been described as comprising a plurality of production rules as elements for generating beta partitioning opinion values and beta partitioning decision values, the beta partitioning expert system may also be implemented in a functional or procedural manner using functional or procedural routines as elements for providing such values. Further, in the beta-token partitioning expert system comprising a plurality of production rules, the node activation data structures 120 and rule data structures 150 may comprise working memory elements in the formats used by the beta-partitioning opinion rules H1 through H13 and the beta decision rules D1 through D6.

Rule Partitioning System

For purposes of rule partitioning, the step of compiling the target expert system program to run on a single processor (see Step 100 in FIG. 3A) generates a RETE network in which join nodes 33 (FIG. 2) may be shared among multiple rules. The principle of node sharing will be explained with the aid of FIGS. 4A and 4B, which show, in schematic form, portions 108 of the RETE network corresponding to the nodes for the left hand sides of three rules defined as follows:

Rule A: $(TC_1)AND(TC_2)AND(TC_3)AND(TC_4)AND(TC_5)AND(TC_6)$

Rule B: $(TC_1)AND(TC_2)AND(TC_3)AND(TC_7)AND(TC_8)$

Rule C: $(TC_1)AND(TC_2)AND(TC_3)AND(TC_4)AND(TC_9)$ where $TC_i 1 \leq i \leq 9$, represent test conditions (corresponding to conditions 21 of FIG. 2) and the AND's represent a logical connectors (corresponding to logical connectors 25 also of FIG. 2). In FIGS. 4A and 4B, the test conditions are represented as test nodes 110 (corresponding to test nodes 32 of FIG. 2) and the logical connectors are represented as join nodes 112 (corresponding to join nodes 33 in FIG. 2). Note that Rules A and B have identical strings of test conditions and logical connectors up to and including test condition $TC_3$ and its corresponding join node 112 (i.e., the join node 112 to which test node 110 labelled TC$_3$ is connected) and Rules A and C have identical strings of test conditions and logical connectors up to and including test condition TC$_4$ and its corresponding join node 112 (i.e., the join node 112 to which test node 110 labelled TC$_4$ is connected). In accordance with node sharing, the compiler enables the generation of only one data structure corresponding to a set of test nodes 110 and join nodes 112 shared by multiple rules. Then, as depicted in FIG. 4B, the complex tokens which issue in response to processing of that data structure are used for all of the rules that share the nodes in a set. For example, the data structure for the segment of Rule A corresponding to test conditions TC$_1$ through TC$_3$ appears only once in the compiled RETE network and during processing, complex tokens CT$_1$ are generated for Rule A as well as Rule B, both of which share those nodes.

During the compilation step, the processor performing the compilation operation identifies the nodes which are candidates for node sharing as follows. Taking one rule at a time, the processor processes each rule to generate a corresponding data structure 108. After a data structure 108 has been generated for a rule and before the data structure for the next rule is generated, the processor identifies the longest sequence of nodes 112 within that data structure 108 that may be shared with at least one of the other rules that have been compiled thus far. The identification of the longest shared node sequence proceeds in stages. In the first stage, the processor identifies all other rules among the rules compiled thus far which have a first test node that is identical to a corresponding test node of the rule being processed. Then, among the identified rules, the processor identifies all previously compiled rules which have a second test node and an associated join node (i.e., the test node 110 that is connected to join node 112) that are identical to the corresponding nodes of the rule being processed. This is repeated down through the test nodes 110 and join nodes 112 which make up data structure 108 of the rule being processed, one level at a time, until a level is reached at which the processor can find no rules which have test nodes 110 or join nodes 112 that are identical to those of the rule being processed. The sequence of join nodes 112 (and associated test nodes 108) down to the immediately prior level represents the longest sequence of shared nodes for the rule being processed. This series of operations is repeated for each data structure for each rule.

Figure 5:
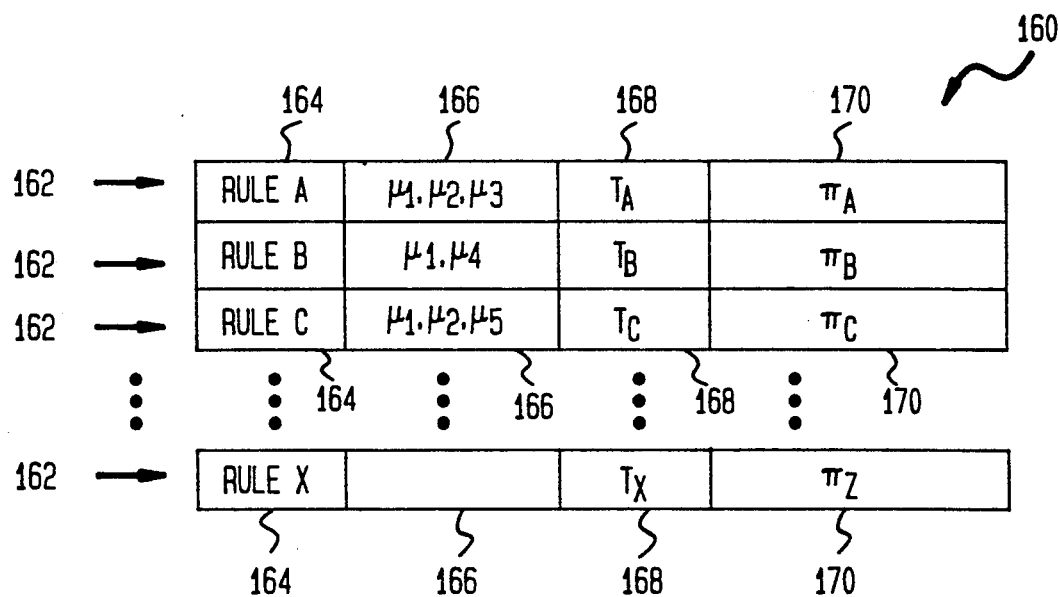

Also, during the compilation step, a mapping that identifies the join nodes 112 corresponding to each particular rule of all the rules to be rule partitioned is generated and stored in a lookaside table 160, such as the one illustrated in FIG. 5. Only the rules deemed unsuitable for beta partitioning (see step 102 of FIG. 3A) are included in the group of rules to be rule partitioned. Lookaside table 160 includes a sufficient number of blocks 162 to represent all of the rules in the target expert system program that are being rule partitioned. Each block 162 includes a rule identifier field 164, a mapping field 166, a total time field 168 and a partition identifier field 170. Each rule for which a mapping is generated is identified in rule identifier field 164 and a list identifying the join nodes which make up that rule is stored in the mapping field 166.

In the described embodiment, the processor accomplishes this mapping by first grouping join nodes 112 into what shall be referred to as $\mu$-blocks 114 and then mapping the $\mu$-blocks to the rules (that is, identifying, for each rule its component $\mu$-blocks) in lookaside table 160. Each $\mu$-block 114 is the longest sequence of connected join nodes 112 that can be constructed without violating the rule that all nodes of any given $\mu$-block 114 must be shared by all members of a set of rules. Thus, in FIG. 4B for example, join nodes 112 numbered 1 and 2 are members of the same $\mu$-block 114, namely, $\mu_1$, because they are part of a sequence and they are each shared by all members of a set of rules, namely, Rules A, B and C. Join node 112 numbered 3, however, cannot be a member of $\mu_1$ because it is not shared by the same set of rules (it is shared only by Rules A and C). All join nodes 112 are assigned to a corresponding numbered $\mu$-block 114 in accordance with these criteria. FIG. 4B depicts a set of $\mu$-blocks 114, namely, $\mu_1$ through $\mu_5$, which are constructed in accordance with such rules.

The mapping of join nodes 112 to the corresponding $\mu$-blocks 114 is retained for subsequent computations which take place during the running of the compiled target program on the single processor. As shall become more apparent, grouping join nodes 112 into $\mu$-blocks 114 reduces the amount of computations required to perform the rule partitioning in accordance with the invention.

When the target program is executed on the single processor, an execution trace of the program is generated and for each recognize-act cycle of the target program an effect set, $e_i$, is generated and stored in an effect set array 172, which organized as illustrated in FIG. 6. Each effect set can be expressed in the following form:

$$e_i = ((\mu_1, t_{i1})(\mu_2, t_{i2}) \ldots (\mu_m, t_{im})),$$

where $e_i$ is the effect set for the $i^{th}$ recognize-act cycle; and which ranges from 1 to P, where P equals the number of recognize-act cycles in the execution sequence;

$\mu_j$ identifies the $j^{th}$ $\mu$-block;

$t_{ij}$ is a measure of the time the program spent in processing the $j^{th}$ $\mu$-block during the $i^{th}$ cycle; and m is the total number of $\mu$-blocks used to describe the network.

Each entry 174 (namely, $t_{ij}$) of array 172 is indexed by the recognize-act cycle (i) and the $\mu$-block 114 ($\mu_j$) to which it corresponds. After the target program has been executed, effect set array 172 contains data for each of P cycles of the execution run.

After effect set data for all of the relevant cycles has been computed and stored in array 172, a measure of the total time spent (represented in FIG. 6 as $S_j$, $1 \leq j \leq m$) in processing each $\mu$-block 114 for all cycles of the program is computed and is then also stored in array 172. In other words, $S_j = \Sigma_i t_{ij}$.

In one embodiment, the measure of the time spent in processing each $\mu$-block 114 during a recognize-act cycle, namely, $t_{ij}$, is estimated by computing for that cycle the total number of activations for all of the join nodes which make up the relevant $\mu$-block. The activation counts required for that computation are available from the node activation data structures 120, (FIG. 3B-1) corresponding to alpha and beta memories 36 and 37 of the relevant join nodes 33 (See FIG. 2). In particular, the per cycle (as well as total) activation counts are derived from the data stored in total activation fields 126 and maximum activations field 131 of the node activation data structures 120 for the mode activation of the relevant join nodes 33.

Alternatively, a hardware clock may be queried upon each token's entry and completion in a node, the elapsed processing time between entry and exit and completion in a node being accumulated for each recognize-act cycle. In that case, the actual per-cycle elapsed times may be stored in array 172 directly.

After the $S_j$'s are computed for all of $\mu$-blocks 114, the processor computes the total time spent in each rule for all of the cycles of the program and stores this in the appropriate total time field 168 in lookaside table 160. The total time for a rule, $T_{rule}$, is the sum of the total times for the $\mu$-blocks 114 which make up the rule. For example, as shown in FIG. 5, Rule A consists of three $\mu$-blocks 114, namely, $\mu_1$, $\mu_2$, and $\mu_3$; thus, $T_A = S_1 + S_2 + S_3$.

Figure 7B:
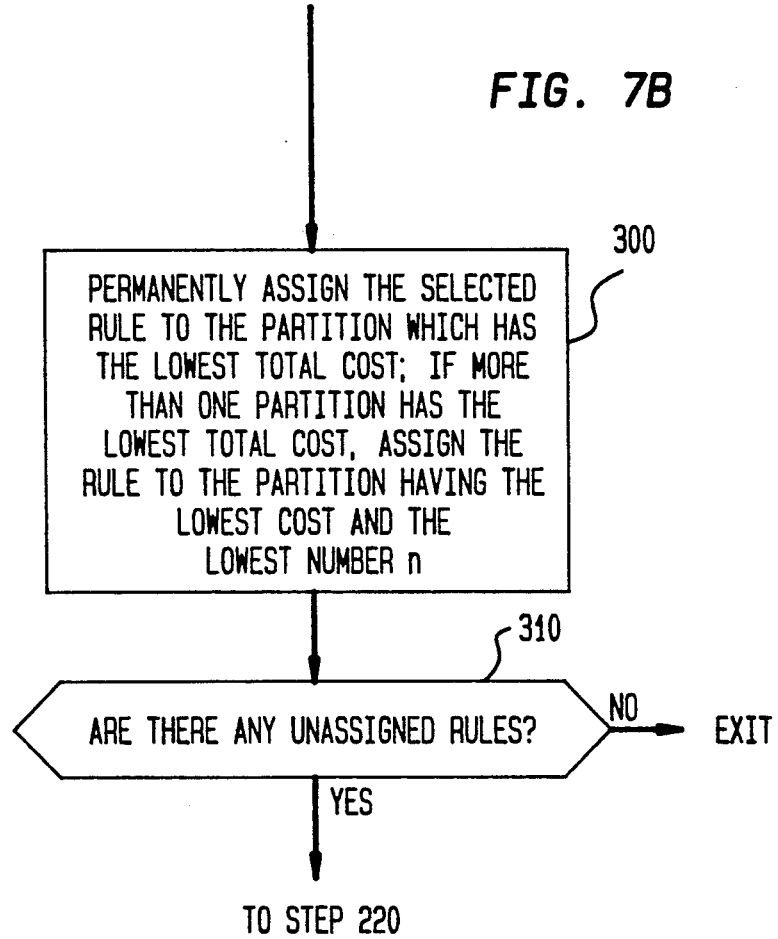

The statistics stored in tables 160 and 172 are subsequently used by a rule partition system (referred to hereinafter as the RP system) to distribute the processing of the rules among the processors of a multiprocessor system by assigning different rules to different processors (see step 104 of FIG. 3A). As shown in FIGS. 7A and 7B, the RP system initially rearranges the order of the rules listed in lookaside table 160 so that they are in descending order according to $T_{rule}$, that is, the total time spent on processing each rule, with the most time consuming rule (i.e., the rule associated with the block 162 having the highest value in its total time field 168) being listed first in table 160 (step 200). Then, the RP system generates a group of empty partition sets, $\pi_n$, $1 \leq n \leq N$, where N is specified by an operator and equals the number of central processing units (CPU's) in the multiprocessor system for which the target expert system program is being rule partitioned (step 210).

Briefly, after the partition sets have been generated, the RP system, for each of the target expert system rules identified in table 160, iteratively performs a series of operations to determine a partition to which the rule should be permanently assigned. During each iteration, the RP system selects a rule and temporarily assigns it to a partition and determines processing times for all of the partitions.

That is, for the partition to which the selected rule has been temporarily assigned, the RP system determines a partition processing time, which relates to the time required to process all rules, if any, which have previously been permanently assigned to the partition, as described below, as well as the rule which is temporarily assigned to the partition. In addition, for each of the partitions to which the rule has not been temporarily assigned, the RP system also determines a partition processing time, which relates to the total time required to process all rules which have previously been permanently assigned to those partitions. The RP system then determines the largest of the partition processing times, which corresponds to the time required to process the target expert system rules assuming the selected rule has been assigned to the one partition (that is, the particular partition to which it was temporarily assigned) as described above. If the RP system has processing times for multiple processing cycles, it does these operations separately for each of the cycles to determine the largest partition processing time over all of the processing cycles.

The RP system iteratively performs these operations to determine the total processing time for each temporary assignment of the selected rule to each partition. Thereafter, it determines the partition having the lowest total processing time, and permanently assigns the rule to that partition. The RP system repeats these iterative operations for each rule identified in table 160, until all of the rules have been assigned to partitions. By these operations, the RP system can determine the assignments of the rules to the various partitions to provide near optimum total processing time for all the rules in the target expert system program that are to undergo rule partitioning.

More specifically, the RP system initially selects the most time consuming rule among the unassigned rules listed in lookaside table 160 (i.e., the rule with the largest $T_{rule}$) (step 220). During processing, the RP system iteratively selects the rules in the order they are listed in the table. After selecting a rule, the RP system initializes an index, k, by setting it equal to one (step 230). The index is used to identify the particular partition $\pi_k$ to which the rule is being assigned, and also to determine when the rule has been assigned to all partitions, at which point interations for that rule stop. Next, after initializing the index k, the RP system temporarily assigns the selected rule to partition $\pi_k$, i.e., the partition identified by the index k (step 240). Based upon this temporary assignment, the RP system computes, for each partition and for each cycle of the program, the time, as determined from array 172, for processing the rules (including the temporarily-assigned rule as well as rules, if any, which were previously permanently assigned to the partition) assigned to the respective partitions (step 250). These process times are derived from the information stored in lookaside table 160, which identifies the $\mu$-blocks assigned to each rule of the target expert system program, and effect data array 172, which lists the time to process each $\mu$-block for each cycle of the target expert system program.

For example, assuming there are two CPU's (and, thus, two partitions, namely $\pi_1$, and $\pi_2$) and assuming Rule A is the most time consuming rule (i.e., the rule taking the longest processing time and thus is the first rule to be selected), during the first iteration Rule A is temporarily assigned to partition $\pi_1$. Since Rule A includes $\mu$-blocks, $\mu_1$, $\mu_2$, and $\mu_3$, and the recorded time for each $\mu$-block is $t_{ij}$ in array 172, the computed process times associated with each partition and for each of three cycles for which it has processing times (given the temporarily assignment of Rule A to partition $\pi_1$) are as follows:

| cycle | $\Pi_1$ | $\Pi_2$ |
| --- | --- | --- |
| 1 | $t_{11} + t_{12} + t_{13}$ | 0 |
| 2 | $t_{21} + t_{22} + t_{23}$ | 0 |
| 3 | $t_{31} + t_{32} + t_{33}$ | 0 |

Since all CPU's must complete processing of rules in its partition during one cycle before any CPU can begin processing the rules for the next cycle, the partition with the maximum processing time for a given cycle establishes the minimum processing time required for all of the CPU's during that cycle. Otherwise stated, the maximum processing time for all CPU's to process their assigned rules during a cycle corresponds to the minimum processing time over that cycle. For notational purposes, in the following description, for a temporary assignment of Rule X to a partition $\pi_k$, the minimum amount of time required for a processor to process a cycle i will be designated as $MT_i(x \rightarrow k)$. In step 260, the RP system determines the value for $MT_i(x\rightarrow k)$ for each cycle by identifying the maximum processing time among all of the computed partition processing times for that cycle. Thus, since the processing times for partition $\pi_2$ are all zeros, the minimum processing time for each cycle is determined by the processing times for partition $\pi_1$; that is:

$$MT_1(A\rightarrow 1) = t_{11} + t_{12} + t_{13}$$

$$MT_2(A\rightarrow 1) = t_{21} + t_{22} + t_{23}$$

$$MT_3(A\rightarrow 1) = t_{31} + t_{32} + t_{33}$$

Next, the RP system computes a total program processing time for the temporary assignment of rule x to partition $\pi_k$, which is designated as $TOT(x\rightarrow k)$, by summing the minimum cycle processing times over all of the cycles (step 270). That is, $$TOT(x\rightarrow k) = \Sigma_i MT_i(x\rightarrow k).$$

Thus, if there are only three cycles, then:

$$TOT(A\rightarrow 1) = t_{11} + t_{12} + t_{13} + t_{21} + t_{22} + t_{23} + t_{31} + t_{32} + t_{33}$$

The resulting value for $TOT(x\rightarrow k)$ is temporarily stored until a permanent assignment for the selected rule has been determined.

After the RP system has determined the total program processing time associated with assigning the selected rule to $\pi_k$, where $k=1$, it increments k (step 280) and then tests k to determine if it is greater than N, the number of partitions (step 290). If k is not greater than N, the RP system returns to step 240 to repeat steps 240, 250, 260 and 270 to temporarily assign the selected rule to partition $\pi_k$, in this case partition $\pi_2$, to generate, in step 290, a total program processing time for that temporary assignment, namely, $TOT(A\rightarrow 2)$. That is, the computed processing times associated with each partition and for each cycle of the program (given the temporary assignment of Rule A to partition $\pi_2$) are as follows:

| cycle | $\Pi_1$ | $\Pi_2$ |
|---|---|---|
| 1 | 0 | $t_{11} + t_{12} + t_{13}$ |
| 2 | 0 | $t_{21} + t_{22} + t_{23}$ |
| 3 | 0 | $t_{31} + t_{32} + t_{33}$ |

It will be appreciated that these times are, for each cycle, identical to the processing times which were determined above for assignment of Rule A to partition $\pi_1$, and the total program processing time, $TOT(A\rightarrow 2)$, will also be identical.

Steps 240 through 270 are interatively repeated for each value of k until the selected rule has been assigned to each partition and a value for the total program processing time $TOT(x\rightarrow k)$ has been computed for each such assignment. At that point, the value for k in step 290 will be greater than N and the RP system will sequence to step 300.

By the time the RP system has sequenced to stop 300 it has determined total program processing times for the temporary assignment of the selected rule to the various partitions. In step 300, the RP system identifies the partition assignment of the selected rule that yielded the lowest total program processing time and permanently assigns the selected rule to that partition. The permanent assignment of the rule to a partition is then recorded in the corresponding partition assignment field 170 of lookaside table 160 (see FIG. 5) of block 162 for the rule. If more than one temporary partition assignment $\pi_k$ for the selected rule have the same lowest total program processing time, as will be the case for the first rule in table 160, the RP system assigns the selected rule to the partition $\pi_k$ having both the lowest total program processing time and the lowest index number, k. Since Rule A is the first rule to be selected and no other rules have yet been permanently assigned to any partition $\pi_k$, the RP system will determine the same processing time for both partition $\pi_1$ and partition $\pi_2$. Thus, Rule A will be assigned to partition $\pi_1$.

After the first selected rule is assigned to a partition, the RP system determines whether there are any other rules which have not been assigned to partitions $\pi_k$ (step 310). If the RP system determines that there are no other rules which have not been assigned, it exits and the rule partitioning is completed. However, if table 160 includes other rules which have not been assigned to a partition $\pi_k$, the RP system branches back to step 220 in which it selects the next rules, which is the next most time consuming unassigned rule and repeats the above-described steps to determine a permanent assignment for that rule.

In determining the processing times for the temporary assignments in each iteration (step 250), the RP system takes into account when nodes are shared among rules. This will be illustrated by the following discussion of the processing of Rule B by the RP system. For example, continuing with arrangement depicted in FIG. 5, if it is assumed that Rule B is the second most time consuming rule in table 160, then during the first iteration of processing Rule B, Rule B is first temporarily assigned to $\pi_1$, to which, as described above, Rule A has been permanently assigned. Given this temporary assignment, the computed process times associated with each partition for the first three cycles of the program are:

| cycle | $\Pi_1$ | $\Pi_2$ |
|---|---|---|
| 1 | $t_{11} + t_{12} + t_{13} + t_{14}$ | 0 |
| 2 | $t_{21} + t_{22} + t_{23} + t_{24}$ | 0 |
| 3 | $t_{31} + t_{32} + t_{33} + t_{34}$ | 0 |

Note that since Rule A and Rule both share $\mu$-block $\mu_1$, the time associated with that $\mu$-block, namely, $t_{11}$, is only included once in the computations.

For the next iteration of the loop including steps 240 through 290 (i.e., for $k=2$), Rule B is temporarily assigned to partition $\pi_2$, and the computed process times associated with each partition and for the first three cycles of the program are:

| cycle | $\Pi_1$ | $\Pi_2$ |
|---|---|---|
| 1 | $t_{11} + t_{12} + t_{13}$ | $t_{11} + t_{14}$ |
| 2 | $t_{21} + t_{22} + t_{23}$ | $t_{21} + t_{24}$ |
| 3 | $t_{31} + t_{32} + t_{33}$ | $t_{31} + t_{34}$ |

In this iteration, the times depicted for partition $\pi_1$ comprise the times for processing Rule A, which has been permanently assigned to that partition. In this example, it should be readily apparent that, regardless of the actual values for $t_{ij}$, Rule B will be permanently assigned to partition $\pi_2$ since that partition has not yet had any rules permanently assigned to it. The total processing time associated with assigning Rule B to partition $\pi_2$, given that Rule A has already been permanently assigned to partition $\pi_1$, must be less than the alternative of also assigning Rule B to partition $\pi_1$.

The benefits of node sharing become more apparent when deciding how to assign rules after each partition has at least one rule already permanently assigned to it. Continuing with the above example and assuming that Rule C is the next most time consuming rule after Rule B, it is first temporarily assigned to partition $\pi_1$ (step 240 for k=1). Then, in step 250, the processing times for each partition and for each cycle are computed to be:

| cycle | $\Pi_1$ | $\Pi_2$ |
|---|---|---|
| 1 | $t_{11} + t_{12} + t_{13} + t_{15}$ | $t_{11} + t_{14}$ |
| 2 | $t_{21} + t_{22} + t_{23} + t_{25}$ | $t_{21} + t_{24}$ |
| 3 | $t_{31} + t_{32} + t_{33} + t_{35}$ | $t_{31} + t_{34}$ |

Note that these times assume that Rules A and B have been permanently assigned to partitions $\pi_1$ and $\pi_2$, respectively, during earlier operations. Also note the impact of node sharing on the values for partition $\pi_1$. Since Rules A and C share $\mu$-blocks $\mu_1$ and $\mu_2$, the processing times for those $\mu$-blocks are counted only once when computing the processing times for the rules assigned to partition $\pi_1$.

Next and in accordance with step 260, the resulting minimum processing times for each cycle, given the temporary assignment of Rule C to partition $\pi_1$ are computed to be:

$$MT_1(C \rightarrow 1) = MAX[t_{11}+t_{12}+t_{13}+t_{15}, t_{11}+t_{14}]$$

$$MT_2(C \rightarrow 1) = MAX[t_{21}+t_{22}+t_{23}+t_{25}, t_{21}+t_{24}]$$

$$MT_3(C \rightarrow 1) = MAX[t_{31}+t_{32}+t_{33}+t_{35}, t_{31}+t_{34}]$$

where MAX[x,y] signifies taking the larger of the two quantities x and y. And, finally in step 270, the total program processing time is computed to be $TOT(C \rightarrow 1) = \Sigma MT_i(C \rightarrow 1)$.

For the next iteration of steps 240 through 290 (k=2), Rule C is temporarily assigned to partition $\pi_2$ (while, as before, Rules A and B are still permanently assigned to partitions $\pi_1$ and $\pi_2$, respectively). This time, in step 250, the processing times for each partition and for each cycle are computed to be:

| cycle | $\Pi_1$ | $\Pi_2$ |
|---|---|---|
| 1 | $t_{11} + t_{12} + t_{13}$ | $t_{11} + t_{12} + t_{14} + t_{15}$ |
| 2 | $t_{21} + t_{22} + t_{23}$ | $t_{21} + t_{22} + t_{24} + t_{25}$ |
| 3 | $t_{31} + t_{32} + t_{33}$ | $t_{31} + t_{32} + t_{34} + t_{35}$ |

Again, note the impact of node sharing on the values for partition $\pi_2$. Since Rules B and C share $\mu$-block $\mu_1$, the processing times for that $\mu$-block is counted only once when computing the processing times for the rules assigned to partition $\pi_2$.

In step 260, the resulting minimum processing times for each cycle, given the temporary assignment of Rule C to partition $\pi_2$, are computed to be:

$$MT_1(C \rightarrow 2) = MAX[t_{11}+t_{12}+t_{13}, t_{11}+t_{12}+t_{14}+t_{15}]$$

$$MT_2(C \rightarrow 2) = MAX[t_{21}+t_{22}+t_{23}, t_{21}+t_{22}+t_{24}+t_{25}]$$

$$MT_3(C \rightarrow 2) = MAX[t_{31}+t_{32}+t_{33}, t_{31}+t_{32}+t_{34}+t_{35}].$$

And, in step 270, the total program processing time is computed to be $TOT(C \rightarrow 2) = \Sigma MT_i(C \rightarrow 2)$.

Finally, in step 300, Rule C is permanently assigned to the partition which yields the smallest $TOT(x \rightarrow k)$. These operations are repeated for each of the rules in table 160.

It should be readily apparent that by using the node sharing a substantial savings in total program processing times can be achieved in those cases where the number of rules exceeds the number of CPU's, which is typically the situation. Also, it should be understood that use of the above-described rule partitioning does not necessarily require the prior use of beta partitioning.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system for building a reticular discrimination network (RETE network) capable of being partitioned across a set of multiple, interconnected computer processors comprising a computer system, from at least a portion of a target expert system, the target expert system comprising a plurality of rules each of which comprises a plurality of conditions grouped in a sequence by a set of logical connectors and a result to occur when the conditions and the logical connectors of the rule are satisfied, the conditions and logical connectors of the rule being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in the a rule being represented by a test node and each of the logical connectors being represented by a join node in the RETE network, the test and join nodes being arranged to determine the satisfaction of the conditions and operation of the logical connectors as represented by the nodes, the nodes also being coupled together to represent the sequence of conditions and logical connectors of the rules of the expert system, the functions of each of the nodes capable of being performed on one of the multiple processors of the computer system, the system for building a RETE network comprising:

a. a memory configured to store the expert system;

b. the memory further configured to store a set of test data elements for use in determining the satisfaction of the conditions of the rules;

c. a beta-token statistics generator coupled to the memory and configured to create a testing RETE-net from the stored expert system comprising a set of test nodes and join nodes representing the conditions and logical connectors in the rules of the expert system arranged such that shared sequences of conditions and logical connectors are represented only once and generate processing statistics for each join node of the testing RETE network by applying the set of test data elements to the testing RETE network;

d. a beta-token opinion generator coupled to the beta-token statistics generator to determine an opinion indicator based on the processing statistics for at least one of the join nodes according to the pre-selected set of heuristics;

e. a beta-token decision generator coupled to the beta-token opinion generator to determine decision indicators for the at least one of the join nodes as a function of the opinion indicators for the at least one of the join nodes, the decision indicators being positive or negative indicators that are based on a pre-determined set of decision making heuristics;

f. an allocator arranged to allocate the nodes of the testing RETE network into partitions as a function of the locations of the at least one of the join nodes when a positive decision indicator for the at least one of the join nodes is determined by the beta-token decision generator, each partition representing one of the multiple processors comprising the computer system; and g. a RETE network builder coupled to the allocator to convert the rules of the target expert system into a computer-executable RETE network, according to the partitions, each partition of the RETE network being arranged to execute on a corresponding processor.

2. The system for building a RETE network of claim 1 wherein one of the logical connectors of the expert system represents the non-existence of a condition and that logical connector is represented by a non-existence test join node in the RETE network.

3. The system for building a RETE network of claim 2 wherein the beta-token opinion generator generates an opinion indicator for the non-existence test join node and the beta-token opinion generator is configured to modify the opinion indicator for the non-existence test join node to cause the beta-token decision generator to generate a negative decision indicator for the non-existence test join node so that beta-token partitioning never occurs at the non-existence test join node.

4. The system for building a RETE network of claim 1 wherein the RETE network is arranged to have a set of join nodes arranged as a series of linked nodes with a first join node being coupled to a subsequent join node, and a plurality of join nodes being coupled in a series to the subsequent join node, including a last join node in the series.

5. The system for building a RETE network of claim 4 wherein the join nodes of the testing RETE network have a left side input coupled to a left side memory for receiving and storing inputs and a right side input coupled to a right side memory for receiving and storing inputs, the inputs including certain ones of the test data elements, the join nodes comparing the inputs stored in the right side memory against the inputs stored in the left side memory to determine those pairs of inputs which satisfy the logical connection represented by the join node, and outputting each input pair with an indicator of the result of the comparison, as an input to other preselected nodes in the RETE network.

6. The system for building a RETE network of claim 5 wherein the beta-token statistics generator generates statistics based on each left side and right side input to each join node.

7. The system for building a RETE network of claim 6 wherein the beta-token opinion generator generates a left and a right opinion indicator corresponding to the left and right side memories of the at least one of the join nodes, respectively based on the corresponding left and right side memory inputs for the at least one of join nodes.

8. The system for building a RETE network of claim 7 wherein the beta-token opinion generator generates left and right opinion indicators for the at least one join nodes that is the first join node in the series of join nodes, and modifies the left opinion indicator of the first join node to diminish the likelihood of beta-token partitioning at that side of the first join node by the allocator.

9. The system for building a RETE network of claim 7 wherein:

a. the beta-token statistic generator determines the number of comparisons that occur at the at least one of the join nodes as the set of test data elements are input to the testing RETE network; and b. the beta-token opinion generator generates opinion indicators for the at least one of the join nodes as a function of the number of comparisons at the at least one of the join nodes as determined by the beta-token statistics generator.

10. The system for building a RETE network of claim 9 wherein the beta-token opinion generator generates opinion indicators so that when the number of comparisons at the at least one of the join nodes is above a pre-determined threshold value, left and right side opinion indicators cause the beta-token decision generator to more likely generate a positive decision indicator so as to favor beta-token partitioning at the join node.

11. The system for building a RETE network of claim 9 wherein the beta-token opinion generator generates left and right side opinion indicators such that, when the number of comparisons at the at least one of the join nodes is below a pre-determined threshold value, the left and right indicators cause the beta-token decision generator to more likely generate a negative decision indicator so as to disfavor beta-token partitioning at the join node.

12. The system for building a RETE network of claim 7 wherein:

a. the beta-token statistic generator determines the number of comparisons made between the left and right side memories at the first and subsequent join node as the set of test data elements are input through the testing RETE network; and b. the beta-token opinion generator generates opinion indicators for the left and right sides of the first join node as a function of the number of comparisons occurring at the subsequent join node.

13. The system for building a RETE network of claim 12 wherein the beta-token opinion generator generates opinion indicators for the left and right sides of the first join node so that when the number of comparisons occurring at the subsequent join node is above a pre-determined threshold, the indicators for the first join node causes the beta-token decision generator to more likely generate a positive decision indicator so as to favor beta-token partitioning at the first join node.

14. The system for building a RETE network of claim 7, wherein the nodes of the RETE network are arranged to receive the set of test data elements in the form of tokens, with each join node performing the comparisons corresponding to its logical connector to output data concerning the result of the comparisons to other nodes in the form of tokens.

15. The system for building a RETE network of claim 14 wherein:
   a. the beta-token statistic generator determines the number of tokens output at each join node of the RETE network; and
   b. the beta-token opinion generator generates opinion indicators for the at least one of the join nodes where the opinion indicators are generated as a function of the number of tokens output by the at least one of the join nodes.

16. The system for building an RETE network of claim 15 wherein, when the number of tokens output from the at least one of the join nodes is above a predetermined threshold, the beta-token opinion generator modifies the left and right side opinion indicators to increase the likelihood that the beta-token decision generator generates a positive decision indicator so that beta-token partitioning occurs at the join node.

17. The system to build an expert system of claim 14, wherein:
   a. the beta-token statistic generator determines the number of tokens received by each of the left and right side inputs of the at least one of the join nodes;
   b. the beta-token opinion generator generates left and right side opinion indicators for the at least one of the join nodes where the left and right side opinion indicators are determined as a function of the number of tokens received at the join node.

18. The system for building a RETE network of claim 17 wherein, when the number of tokens received at the left or right side input is above a pre-determined threshold value, the beta-token opinion generator modifies the corresponding left or right side opinion indicator to increase the likelihood that the beta-token decision generator generates a positive decision indicator so that beta-token partitioning occurs at the join node.

19. The system of building a RETE network of claim 17 wherein, when the number of tokens input to the left or right side of the subsequent join node is above a pre-determined threshold value, the corresponding left or right side opinion indicator generated for the subsequent join node by the beta-token opinion generator is modified to increase the likelihood that beta-token decision generator generates a positive decision indicator so that beta-token partitioning occurs at the join node upstream to the subsequent join node.

20. The system for building a RETE network of claim 14 wherein:
   a. the beta-token statistic generator determines the number of tokens output by each node of the testing RETE network; and
   b. the beta-token opinion generator generates left and right side opinion indicators for the at least one of the join nodes where the opinion indicators are determined as a function of the number of tokens input and tokens output to and from the join node.

21. The system for building a RETE network of claim 20 wherein, when the number of tokens received at the left or right side input of the at least one of the join nodes is greater by a pre-determined ratio than the number of tokens output from the node, the beta-token opinion generator modifies the opinion indicators to reduce the likelihood that the beta-token decision generator generates a positive decision indicator so that beta-token partitioning occurs at the join node.

22. The system for building a RETE network of claim 21 wherein, when the difference between the number of tokens received by the left or right side inputs and the output of the at least one of the join nodes is greater than a predetermined threshold value, the beta-token opinion generator modifies the opinion indicator for the corresponding left or right side to reduce the likelihood that the beta-token decision generator generates a positive decision indicator so that beta-token partitioning occurs at the join node.

23. The system for building a RETE network of claim 22 wherein the beta-token decision generator is arranged to generate a positive left or right side decision indicator for beta-token partitioning at the first join node when the corresponding left or right side opinion indicator for the first join node is at least as great as a pre-determined threshold value and it is at least as great as the difference between the largest opinion indicator for the subsequent join node and a pre-determined delta value.

24. The system for building a RETE network of claim 22 wherein the beta-token generator is arranged to generate a positive left or right side decision indicator for beta-token partitioning at the first join node when the corresponding left or right side opinion indicator for the first join node is equal to or greater than a pre-determined threshold value and there are no subsequent join nodes connected to that join node.

25. The system for building a RETE network of claim 22 wherein the beta-token generator is arranged to generate a positive left or right side decision indicator for beta-token partitioning at the at least one of the join nodes when the join node immediately preceding it that has negative decision indicators for beta-token partitioning, the corresponding left or right opinion indicators at the at least one of the join nodes equals or is greater than a pre-determined threshold, the at least one of the join nodes has a subsequent join node, and the largest of its opinion indicators is at least as large as the difference between the highest opinion indicator of the next subsequent join node in the series and a pre-determined delta value.

26. The system for building a RETE network of claim 7 wherein:
   a. the beta-token statistic generator determines processing times for each join node of the testing RETE network as each join node processes its input data; and
   b. the beta-token opinion generator generates opinion indicators for the left and right sides of the at least one of the join nodes where the opinion indicators are determined as a function of the processing times of the at least one of the join nodes.

27. The system for building a RETE network of claim 7 wherein the beta-token decision generator generates left and right decision indicators for the at least one of the join nodes and the allocator assigns a partition to the at least one of the nodes as a function of those decision indicators.

28. The system for building a RETE network of claim 27 wherein the beta-token decision generator determines left and right decision indicators for the at least one of the join nodes as a function of whether the corresponding left or right beta-token opinion indicators for that join node are above a pre-determined threshold value.

29. The system for building a RETE network of claim 28 wherein the beta-token decision generator modifies the left or right decision indicator for the at least one of the join nodes to be negative when the corresponding left or right opinion indicator for the at least one of the join nodes is above a pre-determined threshold value and the corresponding left or right opinion indicator of the at least one of the join nodes is also less than each opinion indicator of the next adjacent join node in the series less a pre-determined delta value.

30. The system for building a RETE network of claim 29 wherein the beta-token decision generator modifies the left or right decision indicator for the at least one of the join nodes to be negative when the corresponding left or right opinion indicator for the at least one of the join nodes is below a pre-determined threshold value.

31. The system for building a RETE network of claim 27 wherein the beta-token decision generator is arranged to generate a positive decision indicator for beta-token partitioning at the last join node when at least one of the left or right opinion indicators for the last join node is greater than or equal to a pre-determined threshold value and both the decision indicators for the adjacent join node in the series are negative.

32. The system for building a RETE network of claim 4 wherein the beta-token opinion generator generates an opinion indicator for the at least one join node that is the first in the series of join nodes and modifies the opinion indicator to diminish the likelihood of beta-token partitioning at the first join node by the allocator.

33. The system for building a RETE network of claim 1, wherein each join node is arranged to accept data inputs and the data inputs are compared by the join node in performing the test of the logical connector it represents.

34. The system for building a RETE network of claim 33 wherein:
 a. the beta-token statistic generator determines the number of comparisons that occur at the at least one of the join nodes as data elements are input to the testing RETE network; and
 b. the beta-token opinion generator generates an opinion indicator for the at least one of the join nodes as a function of the number of comparisons at the at least one of the join nodes as determined by the beta-token statistics generator.

35. The system for building a RETE network of claim 34 wherein the beta-token opinion generator generates an opinion indicator so that when the number of comparisons at the at least one of the join nodes is above a pre-determined threshold value, the opinion indicator causes the beta-token decision generator to more likely generate a positive decision indicator so as to favor beta-token partitioning at the join node.

36. The system for building a RETE network of claim 34 wherein the beta-token opinion generator generates an opinion indicator such that, when the number of comparisons at the at least one of the join nodes is below a pre-determined threshold value, the opinion indicator causes the beta-token decision generator to more likely generate a negative decision indicator so as to disfavor beta-token partitioning at the join node.

37. The system for building a RETE network of claim 33 wherein:
 a. the join nodes of the testing RETE network are arranged as a series of linked nodes with the at least one of the join nodes being a first join node in the series coupled to a subsequent join node;
 b. the beta-token statistic generator operates to determine the number of comparisons at the first and subsequent join node as the set of test data elements are input through the testing RETE network; and
 c. the beta-token opinion generator generates an opinion indicator for the at least one of the join nodes as a function of the number of comparisons occurring at the subsequent join node, wherein the at least one of the join nodes is the first join node.

38. The system for building a RETE network of claim 37 wherein the beta-token opinion generator generates an opinion indicator so that when the number of comparisons occurring at the subsequent join node is above a pre-determined threshold, the opinion indicator causes the beta-token decision generator to more likely generate a positive decision indicator so as to favor beta-token partitioning at the first join node.

39. The system for building a RETE network of claim 1, wherein the nodes of the RETE network are arranged to receive the set of test data elements in he form of tokens, with each join node performing the operation of the logical connector that it represents to output data in the form of tokens.

40. The system for building a RETE network of claim 39 wherein:
 a. the beta-token statistic generator determines the number of tokens output at each join node of the RETE network; and
 b. the beta-token opinion generator generates an opinion indicator for the at least one of the join nodes where the opinion indicator is determined as a function of the number of tokens output by the at least one of the join nodes.

41. The system for building an RETE network of claim 40 wherein, when the number of tokens output by the at least one of the join nodes is above a predetermined threshold, the beta-token opinion generator modifies the opinion indicator to increase the likelihood that the beta-token decision generator generates a positive decision indicator so that beta-token partitioning occurs at the join node.

42. The system to build an RETE network of claim 39, wherein:
 a. the beta-token statistic generator determines the number of tokens received by the at least one of the join nodes;
 b. the beta-token opinion generator provides an opinion indicator for the at least one of the join nodes where the opinion indicator is determined as a function of the number of tokens received at the join node.

43. The system for building a RETE network of claim 42 wherein, when the number of tokens received is above a pre-determined threshold value, the beta-token opinion generator modifies the opinion indicator to increase the likelihood that the beta-token decision generator generates a positive decision indicator so that beta-token partitioning occurs at the join node.

44. The system of building a RETE network of claim 42 wherein the join nodes are arranged in a series with a first join node coupled to a subsequent join node, the first join node being upstream from the subsequent join node.

45. The system of building a RETE network of claim 44 wherein, for each join node, when the number of tokens input to the subsequent join node is above a pre-determined threshold value, the beta-token opinion generator generates an opinion indicator for the at least one of the join nodes that increases the likelihood that the beta-token decision generator generates a positive decision indicator so that beta-token partitioning occurs at the join node upstream to the subsequent join node.

46. The system for building a RETE network of claim 45 wherein, when the processing time for the at least one of the join nodes is above a pre-determined threshold limit, the beta-token opinion generator modifies the left and right side opinion indicators for that join node to increase the likelihood that the beta-token decision generator generates a positive decision indicator so that beta-token partitioning occurs at the join node.

47. The system for building a RETE network of claim 44 wherein, when the processing time for the at least one of the join nodes is above a pre-determined threshold limit, the beta-token opinion generator modifies the opinion indicator for that join node to increase the likelihood that the beta-token decision generator generates a positive decision indicator so that beta-token partitioning occurs at the join node.

48. The system for building a RETE network of claim 39 wherein:
   a. the beta-token statistic generator determines the number of tokens output by each node of the testing RETE network; and
   b. the beta-token opinion generator generates an opinion indicator for the at least one of the join nodes where the opinion indicator is determined as a function of the number of tokens input and tokens output to and from the join node.

49. The system for building a RETE network of claim 48 wherein, when the number of tokens received at the at least one of the join nodes is greater by a pre-determined ratio than the number of tokens output from the join node, the beta-token opinion generator modifies the opinion indicator to reduce the likelihood that the beta-token decision generator generates a positive decision indicator so that beta-token partitioning occurs at the join node.

50. The system for building a RETE network of claim 49 wherein, when the difference between the number of tokens received and output by the at least one of the join nodes is greater than a pre-determined threshold value, the beta-token opinion generator modifies the opinion indicator to reduce the likelihood that the beta-token decision generator generates a positive decision indicator so that beta-token partitioning occurs at the join node.

51. The system for building a RETE network of claim 1 wherein:
   a. the beta-token statistic generator determines processing time for each join node of the testing RETE network as each join node processes data inputs; and
   b. the beta-token opinion generator generates an opinion indicator for the at least one of the join nodes where the opinion indicator is a function of the processing time for the join node.

52. The system for building a RETE network of claim 1 wherein the testing RETE network is generated on a single processor.

53. The system for building a RETE network of claim 52 wherein the beta-token statistics generator operates on the single processor.

54. The system for building a RETE network of claim 53 wherein the beta-token opinion generator operates on the single processor.

55. The system for building a RETE network of claim 54 wherein the beta-token decision generator operates on the single processor.

56. The system for building a RETE network of claim 55 wherein the allocator operates on the single processor.

57. A system for building a reticular discrimination network (RETE network) capable of being partitioned across a set of multiple, interconnected computer processors comprising a computer system, from at least a portion of a target expert system, the target expert system comprising a plurality rules each of which comprises a plurality of conditions grouped in a sequence by a set of logical connectors and a result to occur when the conditions and the logical connectors of the rule are satisfied, the conditions and logical connectors of the rule being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in the a rule being represented by a test node and each of the logical connectors being represented by a join node in the RETE network, the test and join nodes being arranged to determine the satisfaction of the conditions and operation of the logical connectors as represented by the nodes, the nodes also being coupled together to represent the sequence of conditions and logical connectors of the rules of the expert system, the functions each of the nodes capable of being performed on one of the multiple processors of the computer system, the system for building a RETE network comprising:
   a. a memory configured to store the expert system;
   b. the memory further configured to store a set of test data elements for use in determining the satisfaction of the conditions of the network;
   c. a beta-token statistics generator coupled to the memory and configured to create a test RETE-net from the stored expert system comprising a set of test nodes and join nodes representing the conditions and logical connectors in the rules of the expert system arranged such that shared sequences of conditions and logical connectors are represented only once and generate processing statistics for each join node of the testing RETE network by applying the set of test data elements to the RETE network;
   d. a beta-token opinion generator coupled to the beta-token statistics generator to determine an opinion indicator based on the processing statistics for at least one of the join nodes according to a pre-selected set of heuristics;
   e. a beta-token decision generator coupled to the beta-token opinion generator to determine a decision indicator for the at least one of the join nodes as a function of the opinion indicator for the at least one of the join nodes, the decision indicators being positive or negative indicators that are based on a pre-determined set of decision making heuristics;
   f. a rule partitioner coupled to the beta-token decision generator to rule partition rules whose nodes did result in the generation of any positive beta-token decision indicators after being processed by the beta-token decision generator, the rule partitioning performed in a manner to identify conditions shared by one or more rules and partition the rules as a function of the identified shared conditions;

g. an allocator arranged to allocate the nodes of the testing RETE network from the rules of the expert system into partitions based (1) on the positive decision indicators for the rules that contain nodes that have at least one positive decision indicator and (2) on the results of the rule partitioning for the rules that have no nodes that resulted in the generation of any positive decision indicators; and h. a RETE network builder coupled to the allocator to convert the rules of the target expert system into a computer-executable RETE network, according to the partitions, each partition of the RETE network being arranged to execute on a corresponding processor.

58. The system for building a RETE network of claim 57 wherein the testing RETE network is generated on a single processor.

59. The system for building a RETE network of claim 58 wherein the beta-token statistics generator operates on the single processor.

60. The system for building a RETE network of claim 59 wherein the beta-token opinion generator operates on the single processor.

61. The system for building a RETE network of claim 60 wherein the beta-token decision generator operates on the single processor.

62. The system for building a RETE network of claim 61 wherein the allocator operates on the single processor.

63. The system for building a RETE network of claim 62 wherein the rule partitioner operates on the single processor.

64. A method for building a reticular discrimination network (RETE network) capable of being partitioned across a set of multiple, interconnected computer processors comprising a computer system, from at least a portion of a target expert system, the target expert system comprising a plurality of rules, each of which comprises a plurality of conditions grouped in a sequence by a set of loical connectors and a result to occur when the conditions and the logical connectors of the rule are satisfied, the conditions and logical connectors of the rules being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in a rule being represented by a test node and each of the logical connectors being represented by a join node in the RETE network, the test and join nodes being arranged to determine the satisfaction of the conditions and operation of the logical connectors as represented by the nodes, the nodes also being coupled together to represent the sequence of conditions and logical connectors of the rules of the expert system, the functions each of the nodes capable of being performed on one of the multiple processors of the computer system, the method for building a RETE network comprising the steps of:

a. storing the expert system in a memory;

b. storing in the memory a set of test data elements for use in determining the satisfaction of the conditions of the rules;

c. utilizing the expert system in the memory to create a testing RETE network from the stored expert system, the RETE network comprising a set of test nodes and join nodes representing the conditions and logical connectors in the rules of the expert system arranged such that shared sequences of conditions and logical connectors are represented only once;

d. generating processing statistics for each join node of the testing RETE network by applying the set of test data elements to the RETE network;

e. generating an opinion indicator based on the processing statistics for at least one of the join nodes according to a pre-selected set of heuristics;

f. generating a decision indicator for the at least one of the join nodes as a function of the opinion indicator for the at least one of the join nodes, the decision indicators being positive or negative indicators that are based on a pre-determined set of decision making heuristics;

g. allocating the nodes of the testing RETE network into partitions based on the location of the at least one of the join nodes when a positive decision indicator for the at least one of the join nodes is generated, each partition representing one of the multiple processors comprising the computer system; and h. converting the rules of the target expert system into a computer-executable RETE network, according to the partitions, each partition of the RETE network being arranged to execute on a corresponding processor.

65. The method for building a RETE network of claim 64 wherein one of the logical connectors of the expert system represents the non-existence of a condition and that logical connector is represented by the at least one of the join nodes as a non-existence test join node in the RETE network.

66. The method for building a RETE network of claim 65 comprising the further step of generating an opinion indicator for the non-existence test join node by modifying the opinion indicator for the non-existence test join node to prevent the beta-token partitioning of the non-existence test join node.

67. The method for building a RETE network of claim 64 wherein the RETE network is arranged to have a set of join nodes arranged as a series of linked nodes with the at least one of the join nodes being a first join node which is coupled to a subsequent join node, and a plurality of other join nodes being coupled in a series to the subsequent join node, including a last join node in the series.

68. The method for building a RETE network of claim 67 wherein the join nodes of the testing RETE network have a left side input coupled to a left side memory and a right side input coupled to a right side memory for receiving and storing inputs, the inputs including certain ones of the test data elements, the join nodes comparing the inputs stored in the right side memory against the inputs stored in the left side memory to determine those pairs of inputs which satisfy the logical connector represented by the join node, outputting each input pair with an indicator of the result of the comparison, as an input to other preselected nodes in the RETE network.

69. The method for building a RETE network of claim 68 wherein the generating step comprises the step of generating statistics based on each input to each join node.

70. The method for building a RETE network of claim 69 wherein the step of generating an opinion indicator includes the step of generating a left and a right opinion indicator for each of a left and a right side of the join node.

71. The method for building a RETE network of claim 70 comprising the further step of generating left and right opinion indicators for the first join node that diminish the likelihood of beta-token partitioning occurring at the left side of the first join node of the series when the opinion indicator is evaluated in the decision indicator generating step.

72. The method for building a RETE network of claim 70 further comprising:
  a. determining, in the statistics generating step, the number of comparisons that occur in each join node as the set of test data elements are input to the testing RETE network; and
  b. generating opinion indicators for at the least one of the join nodes as a function of the number of comparisons at the join node as determined in the statistic generating step.

73. The method for building a RETE network of claim 72 comprising the further step of modifying the left and right indicator for the at least one of the join nodes when the number of comparisons at the join node is above a predetermined threshold value so that left and right side the indicators cause generation of a decision indicator in the decision generating step to favor beta-token partitioning at the join node.

74. The method for building a RETE network of claim 72 comprising the further step of determining left and right opinion indicator corresponding to the left and right side memories in the opinion generating step such that, when the number of comparisons at the at least one of the join nodes is below a predetermined threshold value, the left and right opinion indicators cause generation of a decision indicator in the decision generating step to disfavor beta-token partitioning at the join node.

75. The method for building a RETE network of claim 70 further comprising:
  a. determining in the statistic generating step the number of comparisons made between the left and right side memories at the first and subsequent join nodes as data elements are input through the testing RETE network; and
  b. generating opinion indicators corresponding to the left and right side memories as a function of the number of comparisons occurring at the subsequent join node to cause generation of a decision indicator in the decision generating step to favor beta-token partitioning at the first join node.

76. The method for building a RETE network of claim 75 further comprising the step of generating opinion indicators corresponding to the left and right side memories of the first join node when the number of comparisons occurring at the subsequent join node is above a pre-determined threshold so that the opinion indicators for the first join node causes generation of a decision indicator in the decision generating step to favor beta-token partitioning at the first join node.

77. The method for building a RETE network of claim 70, wherein the nodes of the RETE network are arranged to receive as input certain ones of the set of test data elements in the form of tokens, performing the comparisons corresponding to the conditions and logical connectors of the expert system rule and outputting data concerning the result of the comparisons to other nodes in the form of tokens.

78. The method for building a RETE network of claim 77 comprising the further steps of:
  a. determining in the statistic generating step the number of tokens output at each join node of the RETE network; and
  b. generating in the opinion generating step left and right opinion indicators corresponding to the left and right side memories for the at least one of the join nodes where the opinion indicators are determined as a function of the number of tokens output from the join node.

79. The method for building a RETE network of claim 78 comprising the further step of modifying the left and right opinion indicators for the at least one of the join nodes in the opinion generating step such that, when the number of tokens output by the join node is above a pre-determined threshold, the left and right opinion indicators increase the likelihood that the decision indicator generated in the decision generating step favors beta-token partitioning at the join node.

80. The method to build an expert system of claim 77, comprising the further steps of:
  a. determining in the statistic generating step the number of tokens received by each of the left and right side inputs of each join node;
  b. generating modified left and right opinion indicators corresponding to the left and right side memories for the at least one of the join nodes in the opinion generating step where the left and right opinion indicators are determined as a function of the number of tokens received at the join node.

81. The method for building a RETE network of claim 80 comprising the further step of modifying the left and right opinion indicators for the at least one of the join nodes when the number of tokens received at the left or right side input is above a pre-determined threshold value, such that the corresponding left or right opinion indicator is modified to increase the likelihood that a decision indicator generated in the decision generating step determines that beta-token partitioning occurs at the join node.

82. The method of building a RETE network of claim 80 comprising the further step of modifying the left and right opinion indicators for the subsequent join node when the number of tokens input to the left or right side input of the subsequent join node is above a pre-determined threshold value, such that the corresponding left or right side opinion indicator generated for the subsequent join node is modified to increase the likelihood that a decision indicator generated in the decision generating step determines that beta-token partitioning occurs at the join node upstream to the subsequent join node.

83. The method for building a RETE network of claim 77 comprising the further steps of:
  a. determining in the statistic generating step the number of tokens output by each join node of the testing RETE network; and
  b. generating left and right opinion indicators for the at least one of the join nodes in the opinion generating step where the opinion indicators are determined as a function of the tokens input and of tokens output to and from the join node.

84. The method for building a RETE network of claim 83 comprising the further step of modifying the left and right opinion indicators for the at least one of the join nodes when the number of tokens received at the left or right side input of the join node is greater by a pre-determined ratio than the number of tokens output from the join node, such that the opinion indicators are modified to reduce the likelihood that a decision indicator generated in the decision generating step determines that beta-token partitioning occurs at the join node.

85. The method for building a RETE network of claim 84 comprising the further step of modifying the left and right opinion indicators for the at least one of the join nodes when the difference between the number of tokens received by the left or right side inputs and the output of the join node is greater than a predetermined threshold value, such that the left or right opinion indicator for the corresponding left or right side memory is modified to reduce the likelihood that a decision indicator generated in the decision generating step determines that beta-token partitioning occurs at the join node.

86. The method for building a RETE network of claim 70 comprising the further steps of:
   a. determining in the statistic generating step processing times for each join node of the test RETE network as each node processes inputs; and
   b. generating left and right opinion indicators corresponding to the left and right side memories of the at least one of the join nodes in the opinion generating step where the left and right opinion indicators are determined as a function of the processing times of the join node.

87. The method for building a RETE network of claim 70 wherein the decision generating step determines left and right decision indicators for the at least one of the join nodes as a function of whether the corresponding left or right opinion indicator for the join node is above a pre-determined threshold value.

88. The method for building a RETE network of claim 87 comprising the further step of modifying in the decision generating step the left or right decision indicator for the at least one of the join nodes to be negative when the corresponding left or right opinion indicator for the join node is above a predetermined threshold value and the corresponding left or right opinion indicator of the join node is also less than each opinion indicator of the next subsequent join node in the series less a pre-determined delta value.

89. The method for building a RETE network of claim 87 comprising the further step of modifying in the decision generating step the left or right decision indicator for the at least one of the join nodes to be negative when the corresponding left or right opinion indicator for the join node is below a predetermined threshold value.

90. The method for building a RETE network of claim 70 comprising the further step of generating in the decision generating step a positive decision indicator for beta-token partitioning at the last join node when at least one of the left or right opinion indicators for the last join node is greater than or equal to a predetermined threshold value and both the decision indicators for the adjacent join node in the series are negative.

91. The method for building a RETE network of claim 70 comprising the further step of generating in the decision generating step a positive left or right side decision indicator for beta-token partitioning at the first join node when the corresponding left or right side opinion indicator for the first join node is at least as great as a pre-determined threshold value and is at least as great as the difference between the largest opinion indicator for the subsequent join node and a predetermined delta value.

92. The method for building a RETE network of claim 70 comprising the further step of generating in the decision generating step a positive left or right side decision indicator for beta-token partitioning the first join node when the corresponding left or right side opinion indicator for the first join node is equal to or greater than a pre-determined threshold value and there are no subsequent join nodes connected to the join node in the series.

93. The method for building a RETE network of claim 70 comprising the further step of generating in the decision generating step a positive left or right side decision indicator for beta-token partitioning at the at least one of the join nodes when the join node immediately preceding it that has negative decision indicators for beta-token partitioning, the corresponding left or right opinion indicators at the at least one of the join nodes equals or exceeds a predetermined threshold, the at least one of the join nodes has a subsequent join node in the series, and the largest of its opinion indicators is at least as large as the difference between the highest opinion indicator of the subsequent join node in the series and a pre-determined delta value.

94. The method for building a RETE network of claim 67 comprising the further step of generating an opinion indicator for the first join node by modifying the opinion indicator for the join node so that the opinion indicator diminishes the likelihood of beta-token partitioning at the first join node in the series for each rule, when the opinion indicator is evaluated in the decision indicator generating step.

95. The method for building a RETE network of claim 64, wherein each join node is arranged to accept data elements as inputs and the data elements are compared to determine which data elements satisfy the logical connector represented by the join node.

96. The method for building a RETE network of claim 95 further comprising:
   a. determining, in the statistics generating step, the number of comparisons that occur at each join node as the set of test data elements are input to the test RETE network; and
   b. generating an opinion indicator for the at least one of the join nodes as a function of the number of comparisons at the join node as determined in the statistic generating step.

97. The method for building a RETE network of claim 96 comprising the further step of modifying the opinion indicator when the number of comparisons at the at least one of the join nodes is above a pre-determined threshold value so that the opinion indicator causes generation of a decision indicator in the decision generating step to favor beta-token partitioning at the join node.

98. The method for building a RETE network of claim 96 comprising the further step of determining an opinion indicator in the opinion generating step such that, when the number of comparisons at the at least one of the join nodes is below a pre-determined threshold value, the opinion indicator causes generation of a decision indicator in the decision generating step to disfavor beta-token partitioning at the join node.

99. The method for building a RETE network of claim 95 comprising the further step of arranging the testing RETE network as a series of linked nodes with a first join node in the series being coupled to a subsequent join node, the method comprising the further steps of:
   a. determining in the statistic generating step the number of comparisons occurring at the first and subsequent join nodes as data elements are input through the testing RETE network; and
   b. generating an opinion indicator for the at least one of the join nodes as a function of the number of comparisons occurring at the subsequent join node to cause generation of a decision indicator for the at least one of the join nodes in the decision generating step to favor beta-token partitioning at the at least one of the join nodes, wherein the at the at least one of the join nodes is the first join node.

100. The method for building a RETE network of claim 99 further comprising the step of generating an opinion indicator for the first join node, in the opinion generating step, when the number of comparisons occurring at the subsequent join node is above a pre-determined threshold so that the opinion indicator causes generation of a decision indicator for the first join node in the decision generating step to favor beta-token partitioning at the first join node.

101. The method for building a RETE network of claim 64, wherein the nodes of the RETE network are arranged to receive as input certain ones of the set of test data elements in the form of tokens, performing the comparisons corresponding to the conditions and logical connectors of the expert system rule and outputting data concerning the result of the comparisons to other nodes in the form of tokens.

102. The method for building a RETE network of claim 101 comprising the further steps of:
   a. determining in the statistics generating step the number of tokens output at each join node of the RETE network; and
   b. generating in the opinion generating step an opinion indicator for the at least one of the join nodes where the opinion indicator is determined as a function of the number of tokens output from the join node.

103. The method for building an RETE network of claim 102 comprising the further step of modifying the opinion indicator for the at least one of the join nodes in the opinion generating step such that, when the number of tokens output by the join node is above a pre-determined threshold, the opinion indicator increases the likelihood that the decision indicator generated in the decision generating step favors beta-token partitioning occurs at the join node.

104. The method to build a RETE network of claim 101, wherein:
   a. determining in the statistic generating step the number of tokens received by each join node;
   b. generating in the opinion generating step an opinion indicator for the at least one of the join nodes where the opinion indicator is determined as a function of the number of tokens received at the join node.

105. The method for building a RETE network of claim 104 comprising the further step of modifying the opinion indicator when the number of tokens received is above a pre-determined threshold value, such that the opinion indicator is modified to increase the likelihood that a decision indicator generated in the decision generating step determines that beta-token partitioning occurs at the join node.

106. The method of building a RETE network of claim 104 wherein the join nodes are arranged in a series with a first join node coupled to a subsequent join node, the first join node being upstream from the subsequent join node.

107. The method of building a RETE network of claim 106 wherein the at least one of the join nodes is the first join node and wherein, when the number of tokens input to the subsequent join node is above a pre-determined threshold value, the opinion indicator generated in the opinion generating step for first join node increases the likelihood that the decision indicator for the first join node generated in the decision generation step determines that beta-token partitioning occurs at the first join node.

108. The method for building a RETE network of claim 107 comprising the further step of modifying the left and right opinion indicators for the at least one of the join nodes when the processing time for the join node is above a pre-determined threshold limit, such that the left and right side opinion indicators for the join node are modified to increase the likelihood that the decision indicator generated in the decision generation step determines that beta-token partitioning occurs at the join node.

109. The method for building a RETE network of claim 106 comprising the further step of modifying the opinion indicator for the at least one of the join nodes when the processing time for the join node is above a pre-determined threshold limit, such that the opinion indicator for the join node is modified to increase the likelihood that the decision in the decision generating step determines that beta-token partitioning occurs at the join node.

110. The method for building a RETE network of claim 101 comprising the further steps of:
   a. determining in the statistic generating step the number of tokens output by each join node of the testing RETE network; and
   b. generating an opinion indicator for the at least one of the join nodes in the opinion generating step where the opinion indicator is determined as a function of the number of tokens input and of tokens output to and from the join node.

111. The method for building a RETE network of claim 110 comprising the further step of modifying the opinion indicator for the at least one of the join nodes when the number of tokens received at the join node is greater by a predetermined ratio than the number of tokens output from the join node, such that the opinion indicator is modified to reduce the likelihood that a decision indicator generator in the decision generating step determines that beta-token partitioning occurs at the join node.

112. The method for building a RETE network of claim 111 comprising the further step of modifying the opinion indicator for the at least one of the join nodes when the difference between the number of tokens received and output by the join node is greater than a pre-determined threshold value, such that the opinion indicator is modified to reduce the likelihood that a decision indicator generated in the decision generating step determines that beta-token partitioning occurs at the join node.

113. The method for building a RETE network of claim 64 comprising the further steps of:
   a. determining in the statistic generating step processing times for each join node of the testing RETE network as each node processes inputs; and
   b. generating an opinion indicator in the opinion generating step for the at least one of the join nodes where the opinion indicator is a function of the processing time for the join node.

114. The method of building a RETE network of claim 64 wherein the step of generating the testing RETE network is performed on a single processor.

115. The method for building a RETE network of claim 114 wherein the statistic generating step is performed on the single processor.

116. The method for building a RETE network of claim 115 wherein the opinion generating step is performed on the single processor.

117. The method for building a RETE network of claim 116 wherein the decision generating step is performed on the single processor.

118. The method for building a RETE network of claim 117 wherein the allocating step is performed on the single processor.

119. A method for building a reticular discrimination network (RETE network) capable of being partitioned across a set of multiple, interconnected computer processors that comprising a computer system, from at least a portion of a target expert system, the target expert system comprising a plurality rules each of which comprises a plurality of conditions grouped in a sequence by a set of logical connectors and a result to occur when the conditions and the logical connectors of the rule are satisfied, the conditions and logical connectors of the rule being satisfied in comparison against a set of data elements, certain ones of the plurality of rules having conditions that are equivalent to conditions in other ones of the plurality of rules, certain ones of the plurality of rules having sequences of conditions and logical connectors that are equivalent to sequences of conditions and logical connectors in other ones of the plurality of the rules, each of the conditions in the a rule being represented by a test node and each of the logical connectors being represented by a join node in the RETE network, the test and join nodes being arranged to determine the satisfaction of the condition and operation of the logical operation as represented by the nodes, the nodes also being coupled together to represent the sequence of conditions and logical connectors found in the rules of the expert system, the functions each of the nodes capable of being performed on one of the multiple processors of the computer system, the system for building a RETE network comprising:
   a. storing the expert system in a memory;
   b. storing a set of test data elements for use in determining the satisfaction of the conditions of the network in the memory;
   c. accessing the expert system and data elements in the memory to create a testing RETE-net from the stored expert system comprising a set of test nodes and join nodes representing the conditions and logical connectors in the rules of the expert system arranged such that shared sequences of conditions and logical connectors represented only once;
   d. generating processing statistics for each join node of the testing RETE network by applying the set of test data elements to the network;
   e. generating an opinion indicator based on the processing statistics for at least one of the join nodes according to a pre-selected set of heuristics;
   f. generating a decision indicator for the at least one of the join nodes as a function of the opinion indicator for the at least one of the join nodes, the decision indicators being positive or negative indicators that are based on a pre-determined set of decision making heuristics;
   g. partitioning the rules of the expert system according to a rule partition scheme to rule partition rules whose nodes did not result in the generation of any positive beta-token decision indicators after being processed in the decision generating step, the rule partitioning performed in a manner to identify conditions shared by one or more rules and partition the rules as a function of the identified shared conditions;
   h. allocating the nodes of the testing RETE network from the rules of the expert system into partitions based (1) on the positive decision indicators for the rules that contain nodes that have at least one positive decision indicator and (2) on the results of the rule partitioning step for the rules that did not result in the generation of positive decision indicators; and
   i. converting the rules of the target expert system into a computer-executable RETE network, according to the partitions, each partition of the testing RETE network being arranged to execute on a corresponding processor.

120. The method for building a RETE network of claim 117 wherein the step of generating the test RETE network is performed on a single processor.

121. The method for building a RETE network of claim 120 wherein the statistic generating step is performed on the single processor.

122. The method for building a RETE network of claim 121 wherein the opinion generating step is performed on the single processor.

123. The method for building a RETE network of claim 122 wherein the decision generating step is performed on the single processor.

124. The method for building a RETE network of claim 123 wherein the allocating step is performed on the single processor.

125. The method for building a RETE network of claim 124 wherein the rule partitioning step is performed on the single processor.

* * * * *